United States Patent
Rydén et al.

(10) Patent No.: US 11,187,773 B2
(45) Date of Patent: Nov. 30, 2021

(54) POSITIONING SUPPORT INFORMATION FOR TIME OF ARRIVAL (TOA) ESTIMATION IN POSSIBLE MULTIPATH PROPAGATION CONDITIONS

(71) Applicant: TELEFONAKTIEBOLAGET LM ERICSSON (PUBL), Stockholm (SE)

(72) Inventors: Henrik Rydén, Solna (SE); Sara Modarres Razavi, Linköping (SE); Fredrik Gunnarsson, Linköping (SE); Kai-Erik Sunell, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/752,091

(22) PCT Filed: Nov. 1, 2017

(86) PCT No.: PCT/IB2017/056797
§ 371 (c)(1),
(2) Date: Feb. 12, 2018

(87) PCT Pub. No.: WO2018/083610
PCT Pub. Date: May 11, 2018

(65) Prior Publication Data
US 2020/0217918 A1     Jul. 9, 2020

Related U.S. Application Data

(60) Provisional application No. 62/417,442, filed on Nov. 4, 2016.

(51) Int. Cl.
*G01S 5/00* (2006.01)
*H04W 4/029* (2018.01)
(Continued)

(52) U.S. Cl.
CPC .......... *G01S 5/0036* (2013.01); *G01S 5/0215* (2013.01); *G01S 5/0236* (2013.01); *G01S 5/10* (2013.01); *H04W 4/029* (2018.02)

(58) Field of Classification Search
CPC ....... H04W 4/029; H04W 64/00; H04W 2/02; H04W 64/03; H04W 4/20
(Continued)

(56) References Cited

U.S. PATENT DOCUMENTS 5,717,406 A * 2/1998 Sanderford ............. G01S 1/022
342/363
6,313,786 B1 * 11/2001 Sheynblat ............... G01S 19/22
342/357.23

(Continued)

FOREIGN PATENT DOCUMENTS

EP    3 282 275 B1 *  5/2019
EP    3535600 A1      9/2019
(Continued)

OTHER PUBLICATIONS

Cellular Network Positioning Performance Improvements by Richer Device Reporting by Henrik Ryden, Sara Modarres Razavi, Fredrik Gunnarsson, Ivar Olofsson Published in: 2018 IEEE 87th Vehicular Technology Conference (VTC Spring), Jul. 2018. (Year: 2018).*
(Continued)

*Primary Examiner* — William D Cumming
(74) *Attorney, Agent, or Firm* — Christopher & Weisberg, P.A.

(57) ABSTRACT

There is provided a method for providing Observed Time Difference of Arrival (OTDOA) Reference Signal Time Difference (RSTD) measurements from a wireless device to a location server. The method comprises sending, from the wireless node to the location server, a capability to support OTDOA location measurements using multipath RSTD,
(Continued)

receiving, at the wireless node, a request for OTDOA location measurements using multipath RSTD, from the location server. The method comprises receiving, at the wireless node, assistance data providing details of required OTDOA location measurements using multipath RSTD from the location server, receiving, at the wireless node, a signal from an RSTD reference cell and a neighbor cell. The method comprises observing, at the wireless node, a time difference between the received signals thereby obtaining the required OTDOA location measurements using multipath RSTD and sending the required OTDOA location measurements using multipath RSTD from the wireless node to the location server.

32 Claims, 19 Drawing Sheets

(51) Int. Cl.
  *G01S 5/02* (2010.01)
  *G01S 5/10* (2006.01)
(58) Field of Classification Search
  USPC .............. 455/456.1, 456.2, 456.3, 418, 440; 370/331
  See application file for complete search history.

(56) References Cited

U.S. PATENT DOCUMENTS

| | | | | |
|---|---|---|---|---|
| 7,266,354 | B2* | 9/2007 | Jian | H04B 1/707 375/E1.002 |
| 7,308,022 | B2* | 12/2007 | Rick | G01S 5/0215 375/142 |
| 7,660,590 | B2* | 2/2010 | Timiri | H04W 64/00 455/456.3 |
| 7,706,813 | B2* | 4/2010 | Shim | H04W 64/00 455/456.3 |
| 7,737,893 | B1 | 6/2010 | Furman et al. | |
| 7,925,275 | B2* | 4/2011 | Shim | H04W 64/00 455/456.3 |
| 7,925,276 | B2* | 4/2011 | Shim | G01S 5/0205 455/456.3 |
| 7,957,753 | B2* | 6/2011 | Timiri | H04W 4/02 455/456.3 |
| 8,155,251 | B2* | 4/2012 | Baldemair | H04W 24/00 375/343 |
| 8,805,362 | B2* | 8/2014 | Amirijoo | H04W 74/0866 455/434 |
| 8,989,772 | B2* | 3/2015 | Krauss | G01S 5/0221 455/456.1 |
| 10,367,670 | B2* | 7/2019 | Wang | H04L 27/2618 |
| 10,455,350 | B2* | 10/2019 | Kratz | H04W 4/02 |
| 10,477,410 | B1* | 11/2019 | Nilsson | H04W 16/14 |
| 2002/0050944 | A1* | 5/2002 | Sheynblat | G01S 19/30 342/357.25 |
| 2003/0081662 | A1* | 5/2003 | Rick | G01S 5/0215 375/150 |
| 2005/0136942 | A1* | 6/2005 | Timiri | H04W 4/02 455/456.1 |
| 2010/0062752 | A1* | 3/2010 | Shim | H04W 64/00 455/418 |
| 2010/0093372 | A1* | 4/2010 | Timiri | H04W 64/00 455/456.2 |
| 2010/0167757 | A1* | 7/2010 | Shim | G01S 5/0205 455/456.1 |
| 2010/0167759 | A1* | 7/2010 | Shim | G01S 5/0205 455/456.2 |
| 2011/0064046 | A1* | 3/2011 | Zhu | H04W 4/20 370/331 |
| 2011/0143773 | A1 | 6/2011 | Kangas et al. | |
| 2014/0080517 | A1* | 3/2014 | Martinez Olano | H04L 61/1541 455/456.2 |
| 2014/0155082 | A1* | 6/2014 | Krauss | G01S 5/0221 455/456.1 |
| 2014/0176366 | A1 | 6/2014 | Fischer et al. | |
| 2018/0014151 | A1* | 1/2018 | Kratz | H04W 4/029 |
| 2018/0115439 | A1* | 4/2018 | Bhatti | G01S 13/765 |
| 2018/0219869 | A1* | 8/2018 | Kumar | H04W 64/003 |
| 2019/0285721 | A1* | 9/2019 | Xiong | G01S 5/0268 |
| 2020/0217918 | A1 | 7/2020 | Ryden et al. | |

FOREIGN PATENT DOCUMENTS

| | | | | |
|---|---|---|---|---|
| WO | 2011/139201 | A1 | 11/2011 | |
| WO | 2013/019264 | A1 | 2/2013 | |
| WO | 2013/025154 | A1 | 2/2013 | |
| WO | 2014093400 | A1 | 6/2014 | |
| WO | 2018/083610 | A1 | 5/2018 | |
| WO | 2018083610 | A1 | 5/2018 | |
| WO | WO-2019027595 | A1 * | 2/2019 | H04L 5/005 |

OTHER PUBLICATIONS

Localization in 3GPP LTE Based on One RTT and One TDOA Observation byKamiar Radnosrati • Carsten Fritsche • Fredrik Gunnarsson • Fredrik Gustafsson • Gustaf Hendeby Published in: IEEE Transactions on Vehicular Technology (vol. 69, Issue: 3, pp. 3399-3411) Mar. 2020 (Year: 2020).*
Sven Fischer: "Observed Time Difference of Arrival (OTDOA) Positioning in 3GPP LTE"; Jun. 6, 2014; 62 pages.
3GPP TS 36.355 V13.2.0: "3rd Generation Partnership Project; Technical Specification Group Radio Access Network Evolved Universal Terrestrial Radio Access (E-UTRA); LTE Positioning Protocol (LPP)"; (Release 13); Sep. 2016; 141 pages.
International Search Report and Written Opinion for PCT/IB2017/056797, dated Feb. 8, 2018; 14 pages.
Chilean Office Action Action and machine English translation dated Apr. 14, 2020 issued in corresponding Chilean Application No. 201901197, consisting of 20 pages.
Chilean Search Report and machine English translation dated Nov. 11, 2020 issued in corresponding Chilean Application No. 201901197, consisting of 24 pages.
Canadian Office Action dated May 8, 2020 issued in corresponding Canadian Application No. 3042346, consisting of 4 pages.
Indian Examination Report dated Jan. 31, 2021, issued in Indian Patent Application No. 201937015470 ;consisting of 7 pages.
Canadian Examination Report dated Mar. 1, 2021; issued in Patent Application No. 3042346; consisting of 4 pages.
Observed Time Difference of Arrival (OTDOA) Positioning in 3GPP LTE; Jan. 1, 2014 (Jan. 1, 2014), XP055284784, Retrieved from the internet; URL: http://www.terranautx.com/s/Qualcomm-OTD0A-positioning-in-LTE-June-2014.pdf; consisting of 62 pages.

* cited by examiner

POSITIONING SUPPORT INFORMATION FOR TIME OF ARRIVAL (TOA) ESTIMATION IN POSSIBLE MULTIPATH PROPAGATION CONDITIONS

TECHNICAL FIELD

The present disclosure generally relates to wireless communications, wireless communication networks, and wireless communications nodes and devices.

BACKGROUND

Location-based services and emergency call positioning drive the development of positioning in wireless networks, and a plethora of applications and services in terminals take advantage of the availability of the position of the device(s). Positioning in Long-Term Evolution (LTE) is supported by the architecture shown in FIG. 1, with direct interactions between a User Equipment (UE) 1 and a location server 2, namely the Evolved-Serving Mobile Location Centre (E-SMLC) 2, via the LTE Positioning Protocol (LPP). Moreover, there are also interactions between the location server 2 and the eNodeB 3 via the LPPa protocol, to some extent supported by interactions between the eNodeB 3 and the UE 1 via the Radio Resource Control (RRC) protocol.

The following positioning techniques are considered in LTE (3GPP 36.305):

Enhanced Cell Identifier (ID), which essentially consists of cell ID information to associate the UE to the serving area of a serving cell, and then additional information to determine a finer granularity position.

Assisted Global Navigation Satellite System (GNSS) information, which is retrieved by the UE, supported by assistance information provided to the UE from the E-SMLC.

Observed Time Difference of Arrival (OTDOA), in which the UE estimates the time difference of reference signals from different base stations and sends those to the E-SMLC for multilateration. Multilateration is a navigation technique based on the measurement of the difference in distance to two stations at known locations that broadcast signals at known times.

Uplink TDOA (UTDOA), in which the UE is requested to transmit a specific waveform that is detected by multiple location measurement units (e.g. Evolved Universal Terrestrial Radio Access Network NodeBs (eNBs)) at known positions. These measurements are forwarded to the E-SMLC for multilateration.

In the previously listed positioning methods, it is important to estimate the time-of-arrival (TOA) of a signal at the receiver node, from a sender node. The TOA information can be combined to form measurements that support the different fundamental positioning methods:

the difference between two TOAs from two different sender nodes, forming a time difference of arrival measurement, e.g. downlink TDOA;

the difference between two TOAs obtained at two different receiver nodes, based on a signal from a specific sender node, forming a time difference of arrival measurement, e.g. uplink TDOA;

the difference between the TOA at a node, and the subsequent transmission time, indicating the processing time of a node, as well as the difference between a TOA at a node and a previous transmission time, indicating the total round trip time, forming components in a ranging procedure.

All TOA based approaches translate measurements into distances and relative distances based on the signal propagation velocity in the considered medium.

In a general scenario illustrated in FIG. 2, a UE A 1a is served/controlled by a serving/controlling node 6. In addition, UE A 1a can detect a signal from one or more non-serving/non-controlling nodes 7.

The UE 1 may estimate the TOA of a signal from one node, possibly subject to an interfering signal from another node within coverage or communication range. Alternatively, significant interfering signals from other nodes may be avoided by employing a muting scheme where nodes alternate transmission and mute according to a schedule. The scenario may also be reversed, where TOA is estimated in a node, based on a signal from a UE A 1a, possibly subject to interference from a signal from a different UE B 1b. Moreover, the scenario may also be a UE A 1a estimating a TOA based on a signal from a different UE, or a node estimating TOA based on a signal from a different node.

FIG. 3 illustrates the multilateration in OTDOA while considering eNB1 3a as the reference cell. For example, the Observed Time Difference Of Arrival (OTDOA) is a UE-assisted method, in which the UE 1 measures the time of arrival (TOA) of specific Positioning Reference Signals (PRS) from multiple cells (eNBs 3), and in which the UE 1 computes the relative differences between each cell and a reference cell. These Reference Signal Time Difference (RSTD) are quantized and reported via LPP to the E-SMLC 2 together with an accuracy assessment. Based on known positions of eNBs 3 and their mutual time synchronization, it is possible for the E-SMLC 2 to estimate the UE 1 position from the RSTD and covariance reports using multilateration. The accuracy depends on the radio conditions of the received signals, the number of received signals as well as the deployment, which means that it will vary spatially. One of the factors which significantly impacts on the performance of OTDOA, is the assumptions on the UE 1 receiver model and how it estimates the TOA.

Determining TOA

Wireless channels are usually modelled as multipath channels, meaning that the receiving node receives several distorted and delayed copies of the transmitted signal through multiple reflections, diffraction, etc. The multi-path effect can be modelled by considering the following tapped delay link channel.

$$h(t) = \sum_{l=0}^{L} a_l \delta(t - \tau_l)$$

where L is the number of multipath taps (i.e., number of signals received at the UE), $a_l$ denotes the complex attenuation of the l-th tap (i.e., attenuation of the l-th signal received), $\tau_l$ indicates the time delay of the l-th tap and $\delta(t)$ is the delta function, which is one when t=0 and zero otherwise. In order to determine geographical distance between the transmitter and receiver antennas, one should measure $\tau_0$ (time delay corresponding to line-of-sight (LOS) tap) and scale it with the speed of light.

TOA of the signal can be measured based on a reference signal that is known to the receiver. Let us assume that the transmitted signal is denoted as "x(t)", then the received signal "y(t)" subject to multipath channel is given by $$y(t) = \sum_{l=0}^{L} a_l x(t - \tau_l) + w(t)$$

where w(t) models additive noise and interference. Based on the received signal y(t) and the prior knowledge of the transmitted reference signal x(t), the receiver is interested in computing time delay of the first channel tap $\tau_0$ (i.e., TOA of the LOS signal or the signal that arrives earliest if there is no LOS, since that translates to the distance between transmitter and receiver). However, since the received signal is embedded in noise and interference, it is not always easy to determine the first channel tap if it is not strong enough, which is usually the case, for example, in the indoor scenarios.

There can be different methods to determine TOA at the receiver. A simple and widely used method is to cross-correlate the received signal with the known transmitted reference signal, using $$R[\tau] = \sum_{i=0}^{K} y[i]x^-[i-\tau],$$

where K is the length of the received signal discrete domain representation. The cross-correlation function R(τ) gives channel impulse response. The absolute value of R(τ) corresponds to the Profile Delay Profile (PDP) of the channel. The next step is to determine the first channel tap, which can be estimated by determining the first peak $\hat{\tau}$ in R[τ] that is above a certain threshold, using $$\hat{\tau} = \operatorname{argmin}\left\{\frac{|R[\tau]|}{\max\{|R|\}} \geq \zeta\right\}.$$

Finding the LOS component based on the cross-correlation as discussed above, is not an easy task for a UE 1. The UE 1 needs to find a proper threshold in order to find the LOS component since the LOS tap is typically not the strongest tap. If the threshold is too low, the receiver can falsely detect noise as first channel tap and if the threshold is too high, the receiver may miss a weak LOS signal. Therefore, there is typically a trade-off between LOS detection and robustness to noise. For example, FIGS. 4*a* and 4*b* show situations where a UE implementing a threshold 11 (the horizontal solid black line in the figures) based method fails to estimate a proper TOA, indicating the problems with a threshold based peak detection. In these figures, xcorr 8 indicate cross correlation measurements, line 9 indicates exact time, while line 10 indicates estimated time, these times corresponding to distance measurements. FIG. 4*a* exemplifies a situation where having a lower threshold value 11 would have improved the TOA estimation considerably. FIG. 4*b* exemplifies a situation where having a higher threshold value would have improved the TOA estimation considerably.

To solve this problem, in RAN1 #86bis, it has been agreed that multipath RSTD feedback can be reported for up to 2 peaks of each cell.

Additional peaks reporting for downlink positioning

Downlink positioning is based on UE 1 time of arrival (TOA) estimation of positioning reference signals (PRSs) from a reference and neighbouring cells. The UE 1 receiver may detect several occurrences or correlation peaks from a specific cell over a time window, and the UE may try to identify the reference peak as the most likely line of sight peak. Peaks later in time are considered to be due to non-line of sight propagation and peaks earlier in time are considered to be due to noise. Additional peaks reporting enables capable UEs 1 to also report additional peaks from reference and/or neighbouring cells.

FIG. 5 illustrates a reference and additional peaks in the received positioning reference signals from the reference cell and the neighbor cell. This figure shows a possible situation at the UE 1 receiver with both a reference peak and additional peaks from a reference cell and a neighbour cell. In this example, the UE 1 receiver has detected multiple TOA peaks for both the reference cell and a neighbour cell i. For both the reference cell and the neighbour cell, the UE 1 estimates reference peak TOA $t_0$ and $t_1$ respectively. The Reference Signal Time Difference is determined by the UE 1 as the time difference between these reference peaks. The reference peak can be selected based on different strategies, such as the peak with the highest likelihood to be a relevant first peak, or the first peak among the detected peaks. The selection of the reference peak is implementation specific.

In addition, there are additional peaks illustrated in FIG. 5, which are represented by the relative time difference to the reference peak. For the reference cell with the reference peak TOA to and TOA of additional peaks $t_{0,1}$ and $t_{0,2}$, the additional peaks are represented by the relative time differences $\delta_{0,1}=t_{0,1}-t_0$ and $\delta_{0,2}=t_{0,2}-t_0$. Similarly, for the neighbour cell i with the reference peak TOA $t_i$ and TOA of additional peaks $t_{i,1}$ and $t_{i,2}$, the additional peaks are represented by the relative time differences $\delta_{i,1}=t_{i,1}-t_i$ and $\delta_{0,2}=t_{i,2}-t_i$.

SUMMARY

There currently exists certain problem(s).

The effect of what the UE choses for trade-off between robustness to noise and LOS detection can create highly uncertain measurements. In some situations, with many hearable cells, it can be possible to accept some noise peaks since others might compensate for this. While in sparse cells with few cells, one would not afford to detect a noise peak since it may not be possible to accurately determine the position.

Further, the positioning algorithm in the network node might have different capabilities of excluding measurement caused by noise peaks. While the multipath RSTD feedback has been agreed to be standardized, details on how to efficiently assist the UE on this report remains unexplored.

Certain aspects of the present disclosure and their embodiments may provide solutions to these or other problems.

There is provided a method, executed in a target device, for providing Observed Time Difference of Arrival (OT-DOA) Reference Signal Time Difference (RSTD) measurements to a location server. The method comprises the step of sending, to the location server, an indication of a capability to support OTDOA location measurements using multipath RSTD. The method also comprises the step of receiving a request for OTDOA location measurements using multipath RSTD, from the location server. The method further comprises the step of receiving assistance data providing details of required OTDOA location measurements using multipath RSTD, from the location server. The method comprises the step of receiving a signal from an RSTD reference cell and from a neighbor cell and the step of observing a time difference between the received signals thereby obtaining the required OTDOA location measurements using multipath RSTD. The method also comprises the step of sending the required OTDOA location measurements using multipath RSTD to the location server.

There is provided a method, executed in a location server, for receiving Observed Time Difference of Arrival (OTDOA) Reference Signal Time Difference (RSTD) measurements from a target device. The method comprises the step of receiving an indication of a capability to support OTDOA location measurements using multipath RSTD, from the target device. The method also comprises the step of sending a request for OTDOA location measurements using multipath RSTD, to the target device. The method further comprises the step of sending assistance data providing details of required OTDOA location measurements using multipath RSTD, to the target device, and the step of receiving the required OTDOA location measurements using multipath RSTD, from the target device.

There is provided a wireless device operative to provide Observed Time Difference of Arrival (OTDOA) Reference Signal Time Difference (RSTD) measurements to a location server. The wireless device comprises processing circuitry and a memory, the memory containing instructions executable by the processing circuitry whereby the wireless device is operative to send, to the location server, an indication of a capability to support OTDOA location measurements using multipath RSTD. The wireless device is also operative to receive a request for OTDOA location measurements using multipath RSTD, from the location server and to receive assistance data providing details of required OTDOA location measurements using multipath RSTD, from the location server. The wireless device is further operative to receive a signal from an RSTD reference cell and from a neighbor cell, to observe a time difference between the received signals thereby obtaining the required OTDOA location measurements using multipath RSTD, and to send the required OTDOA location measurements using multipath RSTD to the location server. There is provided a location server operative to receive Observed Time Difference of Arrival (OTDOA) Reference Signal Time Difference (RSTD) measurements from a wireless device, the location server comprising processing circuitry and a memory, the memory containing instructions executable by the processing circuitry whereby the location server is operative to receive an indication of a capability to support OTDOA location measurements using multipath RSTD, from a wireless device. The location server is also operative to send a request for OTDOA location measurements using multipath RSTD, to the wireless device and to send assistance data providing details of required OTDOA location measurements using multipath RSTD, to the wireless device.

The location server is further operative to receive the required OTDOA location measurements using multipath RSTD, from the wireless device.

DETAILED DESCRIPTION

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Various features and embodiments will now be described with reference to the figures to fully convey the scope of the disclosure to those skilled in the art. Many aspects will be described in terms of sequences of actions or functions. It should be recognized that in some embodiments, some functions or actions could be performed by specialized circuits, by program instructions being executed by one or more processors, or by a combination of both. Further, some embodiments can be partially or completely embodied in the form of computer-readable carrier or carrier wave containing an appropriate set of computer instructions that would cause a processor to carry out the techniques described herein. In some alternate embodiments, the functions/actions may occur out of the order noted in the sequence of actions or simultaneously. Furthermore, in some illustrations, some blocks, functions or actions may be optional and may or may not be executed; these are generally illustrated with dashed lines.

According to an embodiment, a network node, such as a location server 2, can configure the UEs 1 with a probability-threshold or/and expected multipath measurement for different multipath scenarios in order to consider a trade-off between LOS detection and robustness to noise.

In order to do so, support information may be sent from the network node to a receiver entity to support TOA estimation in possible multipath propagation conditions. The receiver entity may be a UE 1 or a wireless device, but can also be a receiver node, in more general terms, for example a base station 3.

Figure 1:
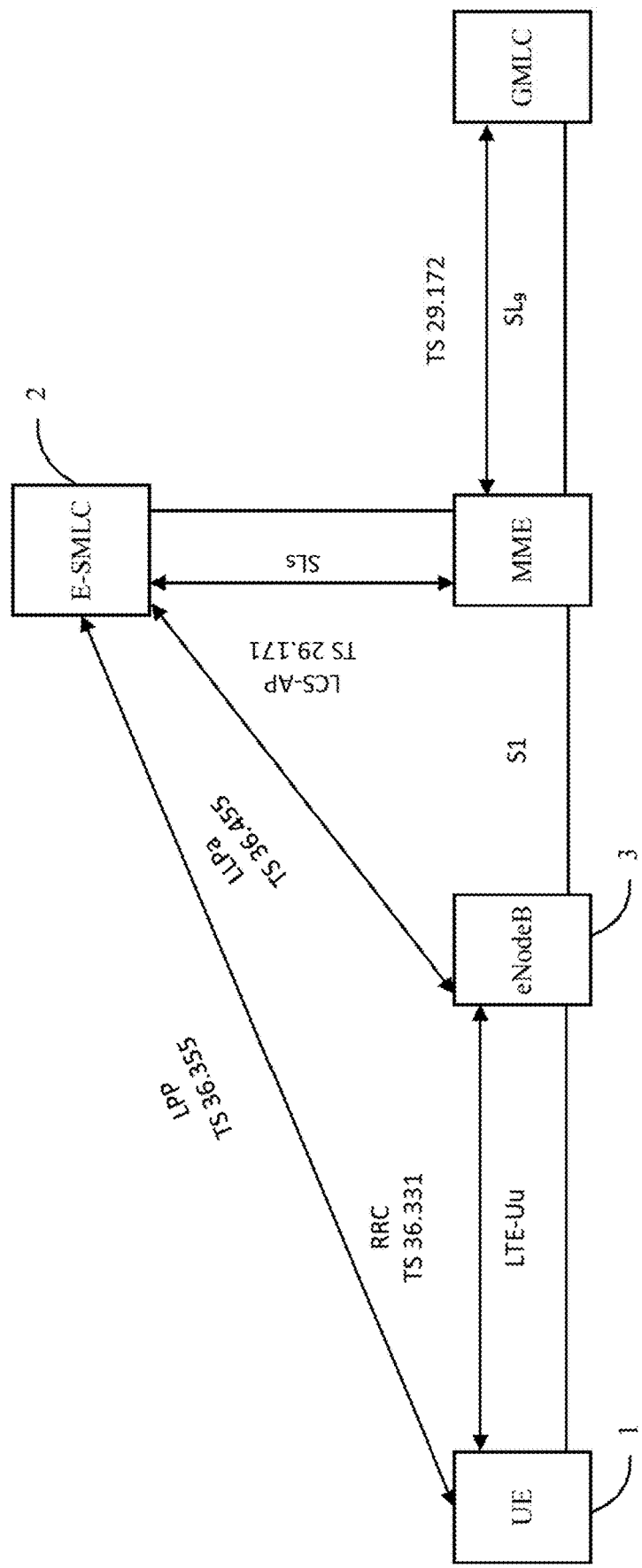
FIG. 1 a schematic illustration of the LTE positioning architecture.
Figure 2:
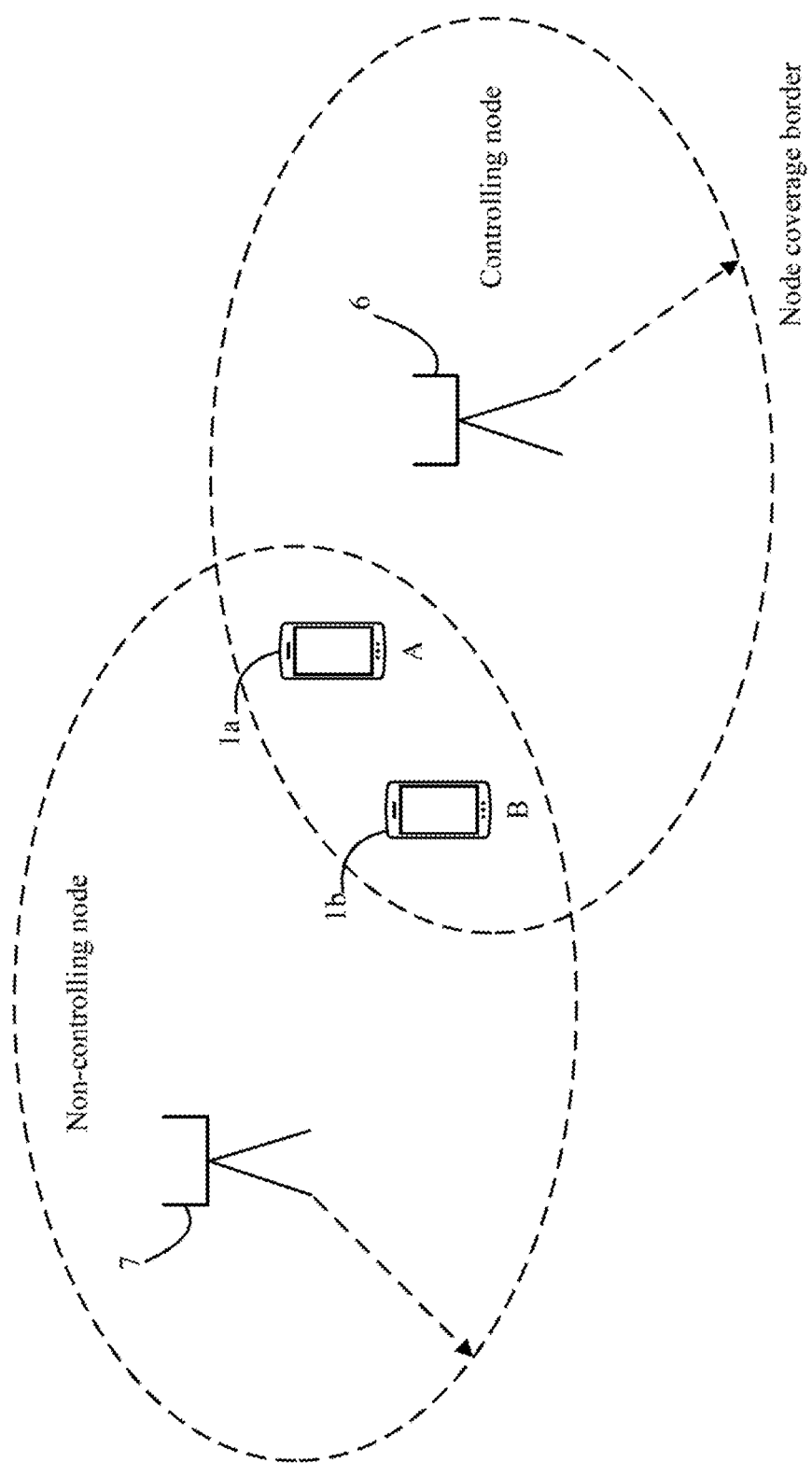
FIG. 2 is a schematic illustration of two cells with two nodes and two UEs according to an example.
Figure 3:
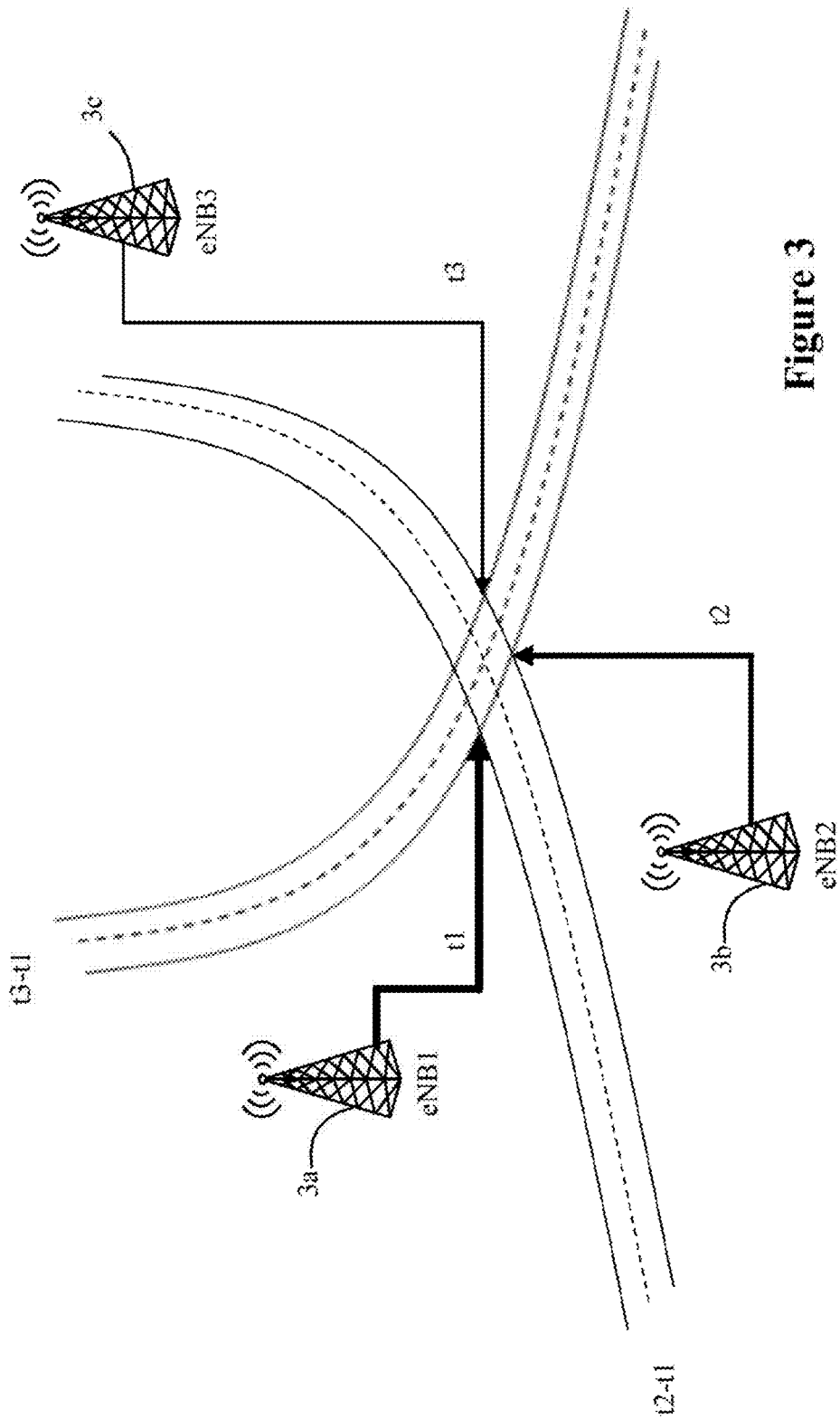
FIG. 3 is a schematic illustration of OTDOA position estimation based on multilateration on the RSTD measurements according to an example.
Figure 4A:
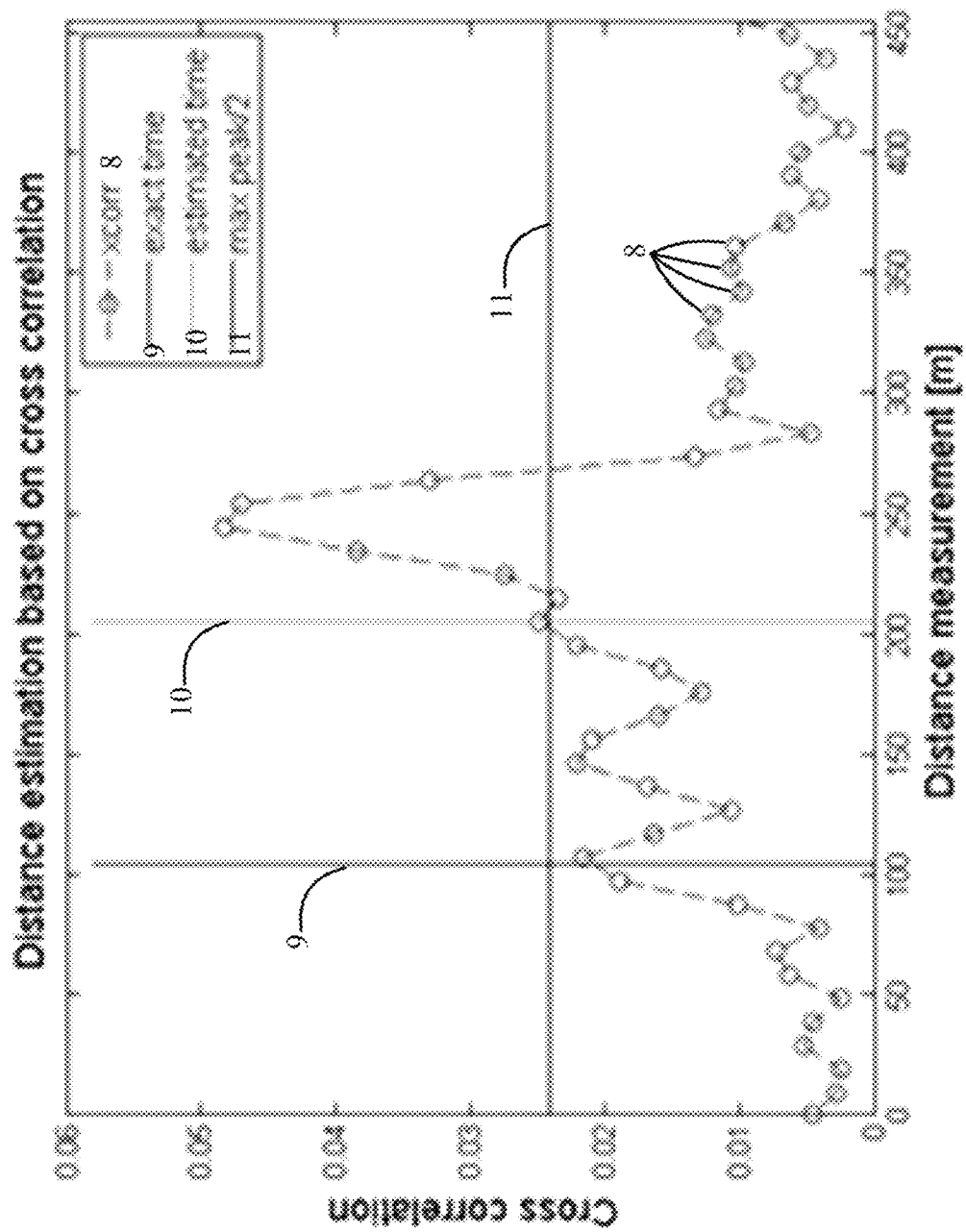
FIGS. 4a and 4b are graphs illustrating distance estimation based on cross correlation according to some examples.
Figure 4B:
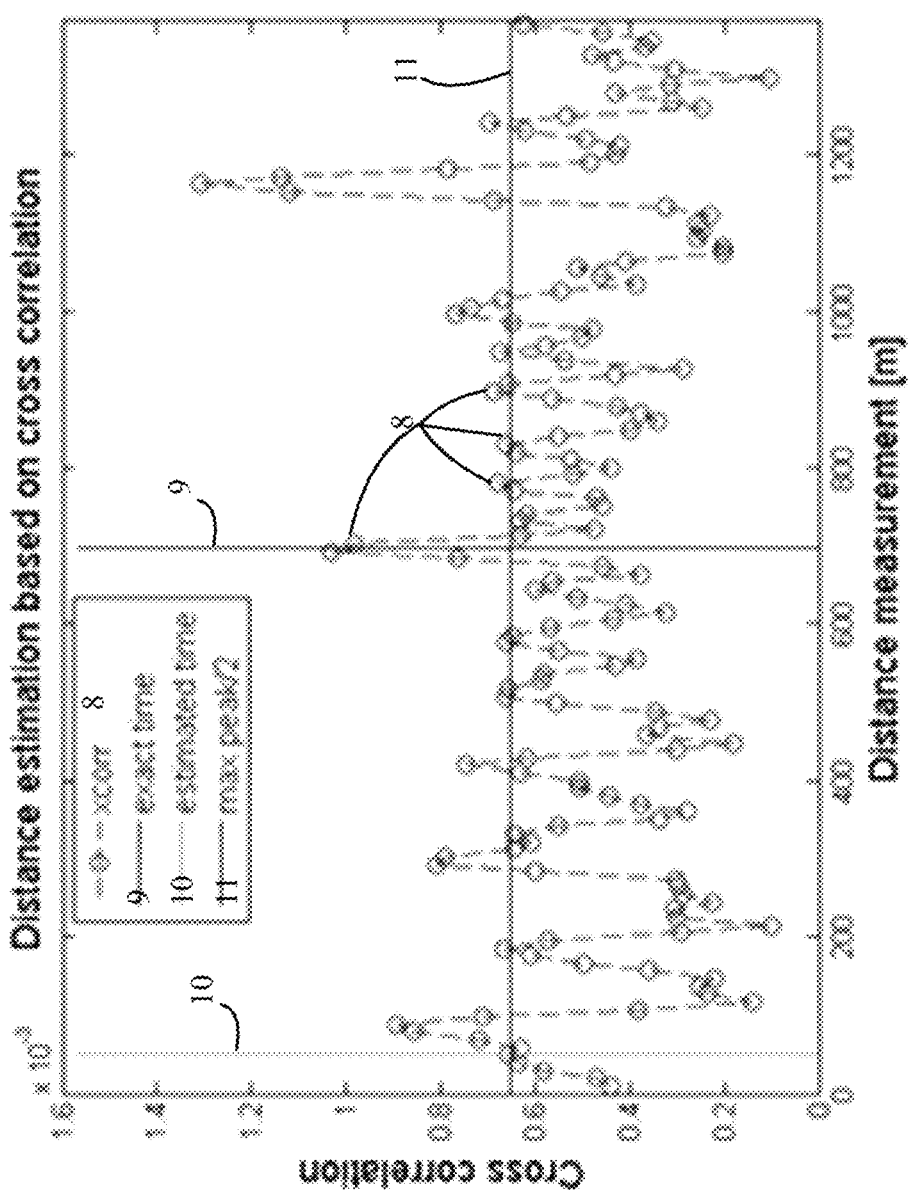
Figure 5:
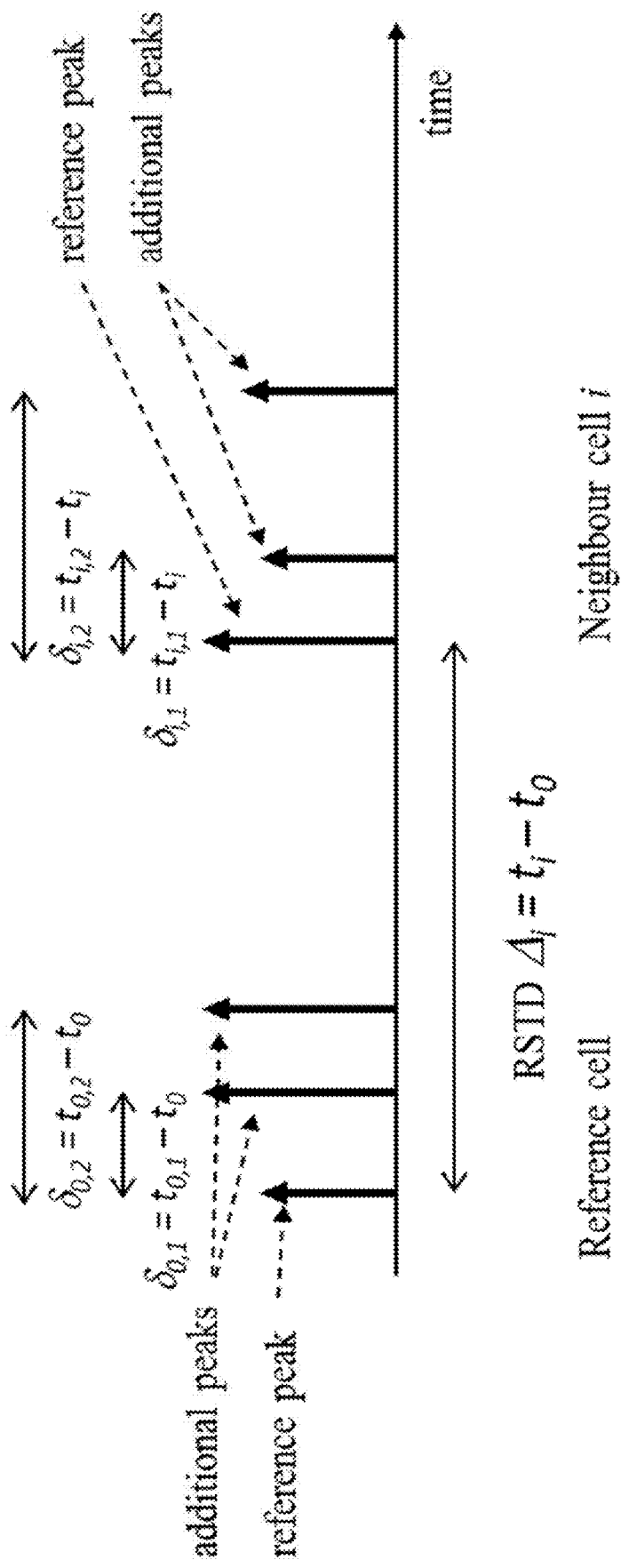
FIG. 5 is a schematic illustration of peaks in positioning reference signals according to an example.
Figure 6:
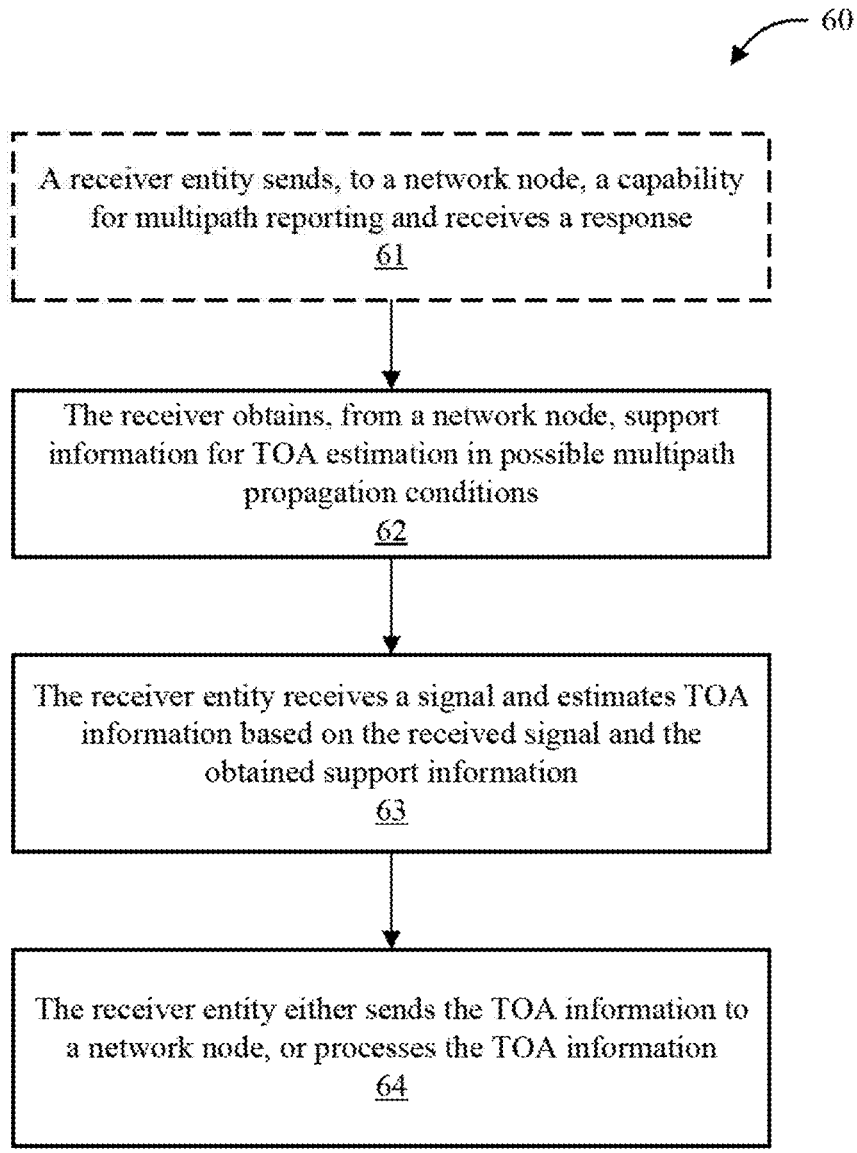
FIG. 6 is a flowchart of a method according to an embodiment.

FIG. 6 illustrates a method 60 from a receiver entity perspective, according to an embodiment, comprising:
- optionally, the receiver entity sends, to a network node, a capability for multipath reporting and receiving a response, step 61;
- the receiver obtains, from the network node, support information for Time of Arrival (TOA) estimation in possible multipath propagation conditions, step 62;
- the receiver entity receives a signal and estimates TOA information based on the received signal and on the obtained support information, step 63; and
- the receiver entity either sends the TOA information to a network node, or processes the TOA information, step 64.

The step of processing the TOA information 64 may be done locally in the wireless device.

Figure 7:
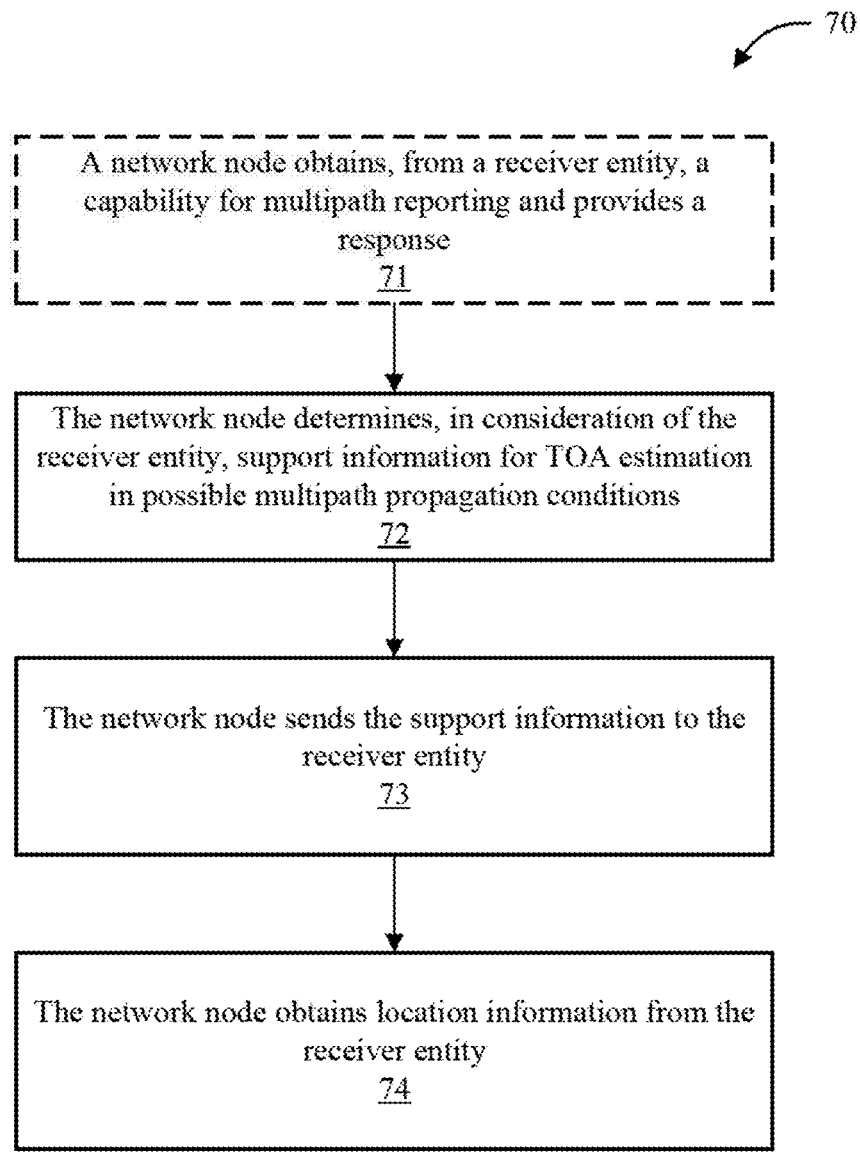
FIG. 7 is a flowchart of a method according to another embodiment.

FIG. 7 illustrates a method 70 from a network node perspective, according to an embodiment, comprising:
- optionally, the network node obtains, from a receiver entity, a capability for multipath reporting and provides a response, step 71;
- the network node determines, in consideration of the receiver entity, support information for TOA estimation in possible multipath propagation conditions, step 72;
- the network node sends the support information to the receiver entity, step 73; and
- the network node obtains location information from the receiver entity, step 74.

Alternatively worded, there is provided a method 70, executed in a network node, comprising:
- determining, in consideration of a wireless device, support information for TOA estimation in possible multipath propagation conditions, step 72;
- sending the support information to the wireless device, step 73; and
- obtaining location information from the wireless device, step 74.

The method may further comprise obtaining, from the wireless device, a capability for multipath reporting and provides a response, step 71.

The steps of the above methods are described below and in more details. The support information sent to the target device in possible multipath propagation scenarios, as well as the actions considered, can differ in different embodiments. In one embodiment, the network node signals an expected multipath indication to the UE. When the indication is set to TRUE (or if interpreted as TRUE. e.g. in some context if the indication is explicitly missing), the UE interpret this as an indication that it is likely that multipath propagation can be experienced. This can trigger the UE to explicitly search for, detect and/or measure additional peaks in a received signal. The indication can be given in general, or in relation to one or more cells or reference signals or a received packet or packets.

The network node can trigger the sending, to a first UE, of an expected multipath indication set to TRUE in cases comprising:
- where there is historical information indicating that UEs previously have reported multipath propagation and/or additional peaks:
  - with the same serving node as the one serving the first UE;
  - with the same approximate location as the first UE, for example with the same tracking area/location area/ routing area (information that associates the LIE to a set of cells, nodes, reference signals) information as the first UE;
  - with at least one cell/node/reference signal in the assistance data provided to UEs being the same as for the first UE;
- where there is historical information indicating that UEs previously have been positioned with relatively poor accuracy:
  - for example determined by comparing positioning based on at least two positioning methods, such as Global Navigation Satellite System (GNSS) on the one hand and a TOA-based method on the other;
- according to deployment information of the node:
  - if the node is deployed in high scattering environment, for example indoor, or in dense urban areas.

When the indication is set to FALSE (or if interpreted as FALSE. e.g. in some context if the indication is explicitly missing), the UE interpret this as an indication that it is not likely that multipath propagation can be experienced. This can trigger the UE to refrain from searching for, detect and/or measure additional peaks in a received signal. The indication can be given in general, or in relation to one or more cells or reference signals or a received packet or packets.

The network node can trigger the sending, to a first UE, of an expected multipath indication set to FALSE in cases comprising:
- where there is historical information indicating that UEs previously have not reported multipath propagation and/or additional peaks:
  - with the same serving node as the one serving the first UE;
  - with the same approximate location as the first UE, for example with the same tracking area/location area/ routing area (information that associates the UE to a set of cells, nodes, reference signals) information as the first UE;
  - with at least one cell/node/reference signal in the assistance data provided to UEs being the same as the first UE;
- where there is historical information indicating that UEs previously have been positioned with relatively good accuracy without considering information about additional peaks:
  - for example determined by comparing positioning based on at least two positioning methods, such as GNSS, on the one hand, and a TOA-based method on the other;
- according to deployment information of the node:
  - if the node is deployed in low scattering environment, for example in open outdoor areas.

Figure 8:
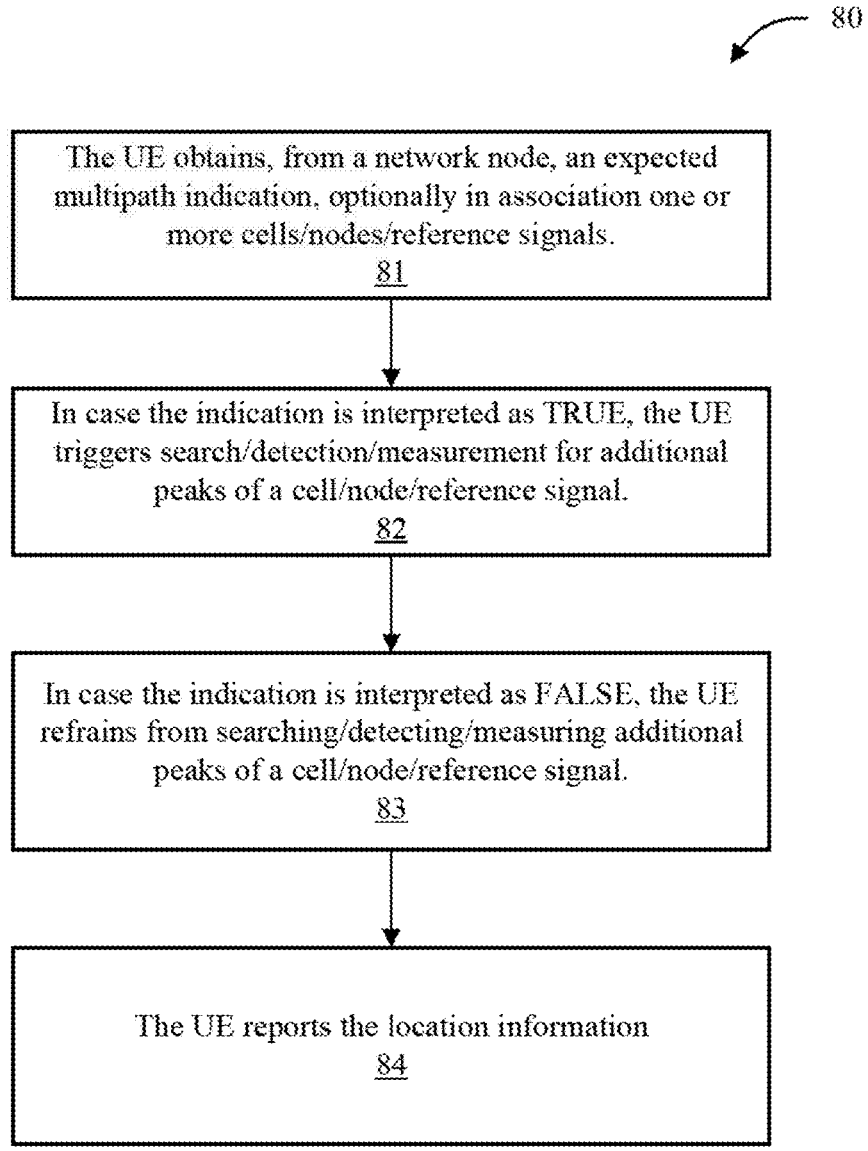
FIG. 8 is a flowchart of a method according to another embodiment.

FIG. 8 illustrates a method 80, from a UE perspective, according to an embodiment where the TOA support information is an expected multipath indication, comprising:
- the UE obtains, from a network node, an expected multipath indication, optionally in association one or more cells/nodes/reference signals, step 81;
- in case the indication is interpreted as TRUE, the UE triggers search/detection/measurement for additional peaks of a cell/node/reference signal, step 82;
- in case the indication is interpreted as FALSE, the UE refrains from searching/detecting/measuring additional peaks of a cell/node/reference signal, step 83; and
- the UE reports the location information, step 84.

Alternatively worded, FIG. 8 illustrates a method 80, executed in a UE, where the TOA support information is an expected multipath indication, comprising:
  obtaining, from a network node, an expected multipath indication, step 81;
  if the indication is interpreted as TRUE, triggering search/detection/measurement for additional peaks of a cell/node/reference signal, step 82;
  if the indication is interpreted as FALSE, refraining (not triggering) from searching/detecting/measuring additional peaks of a cell/node/reference signal, step 83; and
  reporting the location information, step 84.

The method wherein in step 81, the multipath indication is in association one or more cells/nodes/reference signals.

The sequences below show an example signaling impact according to an embodiment.

The TOA estimate is then determined based on the identified (valid) peaks, where a valid peak is a peak above the probability threshold, and the TOA estimate can, for example, be determined as the first of the valid peaks.

Figure 9:
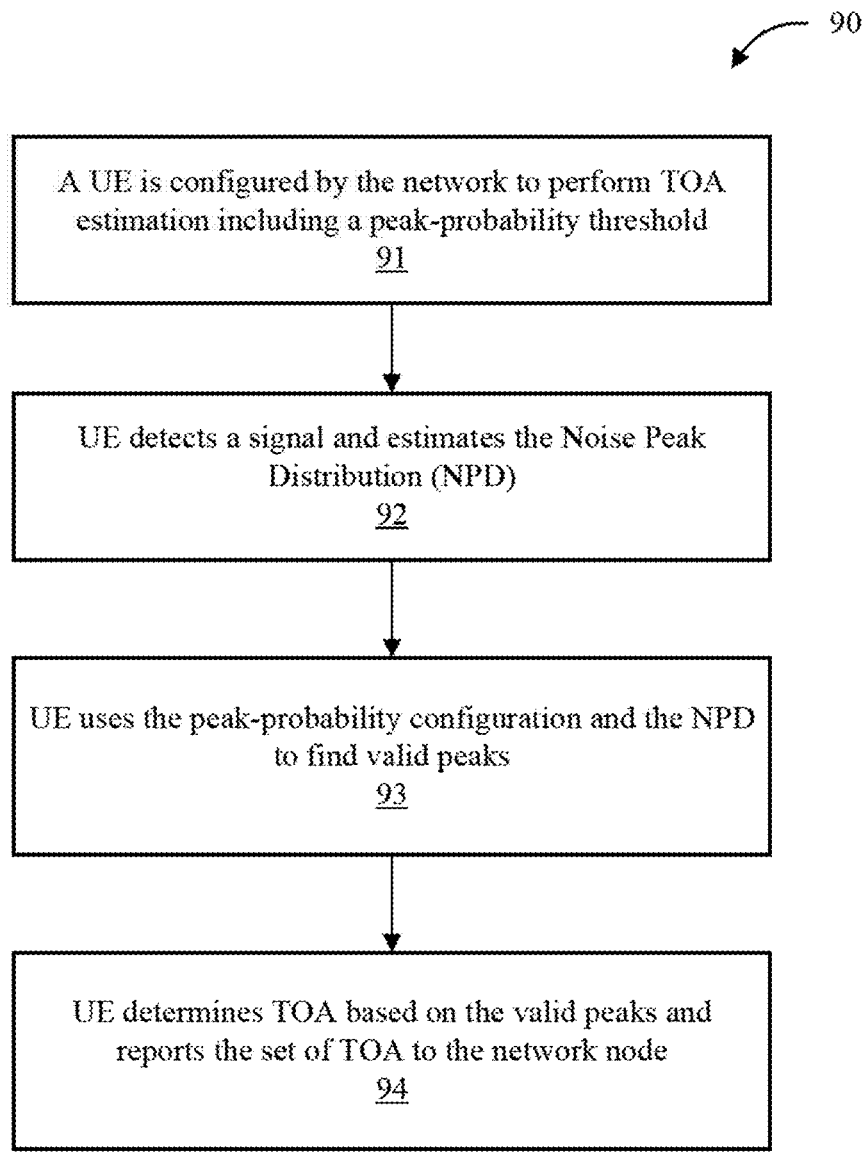
FIG. 9 is a flowchart of a method according to another embodiment.

FIG. 9 illustrates a method 90, from a UE perspective, according to an embodiment comprising:
  the UE is configured by the network, or receives configuration settings from a network node, to perform TOA estimation including a peak-probability threshold, step 91;
  the UE detects a signal and estimates the Noise Peak Distribution (NPD), step 92;
  the UE uses the peak-probability configuration and the NPD to find valid peaks, step 93; and
  the UE determines TOA based on the valid peaks and reports the set of TOA to the network node, step 94.

```
-- ASN1START
OTDOA-ReferenceCellInfo    ::= SEQUENCE {
    physCellId              INTEGER (0..503),
    cellGlobalId            ECGI                            OPTIONAL,  -- Need ON
    earfcnRef               ARFCN-ValueEUTRA                OPTIONAL,  -- Cond NotSameAsServ0
    antennaPortConfig       ENUMERATED {ports1-or-2, ports4, ... }
                                                            OPTIONAL,  -- Cond NotSameAsServ1
    cpLength                ENUMERATED { normal, extended, ... },
    prsInfo                 PRS-Info                        OPTIONAL,  -- Cond PRS
    ...,
    [[ earfcnRef-v9a0 ARFCN-ValueEUTRA-v9a0                 OPTIONAL   -- Cond NotSameAsServ2
    ]],
    [[ tpId-r14             INTEGER (0..4095)               OPTIONAL   -- Need ON
    ]] ]],
    [[ expectedMultipathRef-v14   BOOLEAN                   OPTIONAL
    ]]
}
-- ASN1STOP
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId              INTEGER (0..503),
    cellGlobalId            ECGI                            OPTIONAL,  -- Need ON
    earfcn                  ARFCN-ValueEUTRA                OPTIONAL,  -- Cond NotSameAsRef0
    cpLength                ENUMERATED {normal, extended, ...}
                                                            OPTIONAL,  -- Cond NotSameAsRef1
    prsInfo                 PRS-Info                        OPTIONAL,  -- Cond NotSameAsRef2
    antennaPortConfig       ENUMERATED {ports-1-or-2, ports-4, ...}
                                                            OPTIONAL,  -- Cond NotsameAsRef3
    slotNumberOffset        INTEGER (0..19)                 OPTIONAL,  -- Cond NotSameAsRef4
    prs-SubframeOffset      INTEGER (0..1279)               OPTIONAL,  -- Cond InterFreq
    expectedRSTD            INTEGER (0..16383),
    expectedRSTD-Uncertainty    INTEGER (0..1023),
    ...,
    [[ earfcn-v9a0          ARFCN-ValueEUTRA-v9a0           OPTIONAL   -- Cond NotSameAsRef5
    ]],
    [[ tpId-r14             INTEGER (0..4095)               OPTIONAL,  -- Need ON
       prs-only-tp-r14          ENUMERATED { true }         OPTIONAL   -- Cond TBS
    ]] ,
    [[ expectedMultipathNeighbour-v-14 BOOLEAN              OPTIONAL
    ]]
}
maxFreqLayers  INTEGER ::= 3
-- ASN1STOP
```

For TOA estimation, there is an important trade-off between Line of Sight (LOS) detection and robustness to noise. Given a received signal, the UE 1 can analyze the different peaks, where each peak is associated to a value such as the received power, cross-correlation, etc. of the signal in relation to a threshold, and consider peaks above the threshold as valid peaks, and peaks under the threshold as noise peaks. Instead of using a threshold with a predetermined value, a peak-probability threshold can be used. A peak-probability threshold can, for example, be based on cell deployment data and the network positioning algorithm.

Alternatively worded, FIG. 9 provides a method 90, executed in a UE, comprising:
  receiving configuration settings from a network node, to perform TOA estimation including a peak-probability threshold, step 91;
  detecting a signal and estimating a Noise Peak Distribution (NPD), step 92;
  identifying valid peaks using the peak-probability configuration and the NPD, step 93; and
  determining TOA based on the valid peaks and reports the set of TOA to the network node, step 94.

Step 91 may further comprise setting the peak-probability threshold to a given value, where a higher threshold implies more or better robustness to noise. The peak-probability may be configured in a network node and signaled to the UE. The network node/UE can base the decision, i.e. the identification of valid peaks, on the following:

Capabilities to exclude non-line of sight (NLOS) measurements where a network node with capabilities might be able to exclude erroneous measurement caused by a noise peak detection. That can allow to set a lower probability threshold.

Cell deployment data given a rough position of the UE, e.g. the location of the cell where it is connected, where the network node can estimate the rough number of hearable cells for the UE, if the number of cells is high. In this case, the network node can use a lower threshold since this scenario typically provides a few highly accurate measurements, in comparison with many bad measurements that can be obtained with other scenarios.

In step 92, the Noise Peak Distribution (NPD) may comprise a probability of a peak being caused by noise. The NPD is for example based on the noise window in FIG. 10, where a UE can estimate the variance (σ) of the noise peak amplitudes given a normalized Profile Delay Profile (PDP). The NDP can then be modelled using a Rice-distribution with the estimated a if the noise properties are circular complex Gaussian. Two examples of NPDs are shown in FIG. 11, first an NDP from a cell with high Signal to noise ratio (SNR) (i.e. low σ), and secondly from a cell with low SNR (high σ). Also, the NDP can be made by directly creating a Cumulative Density Function (CDF) based on the peaks in the noise window.

Figure 10:
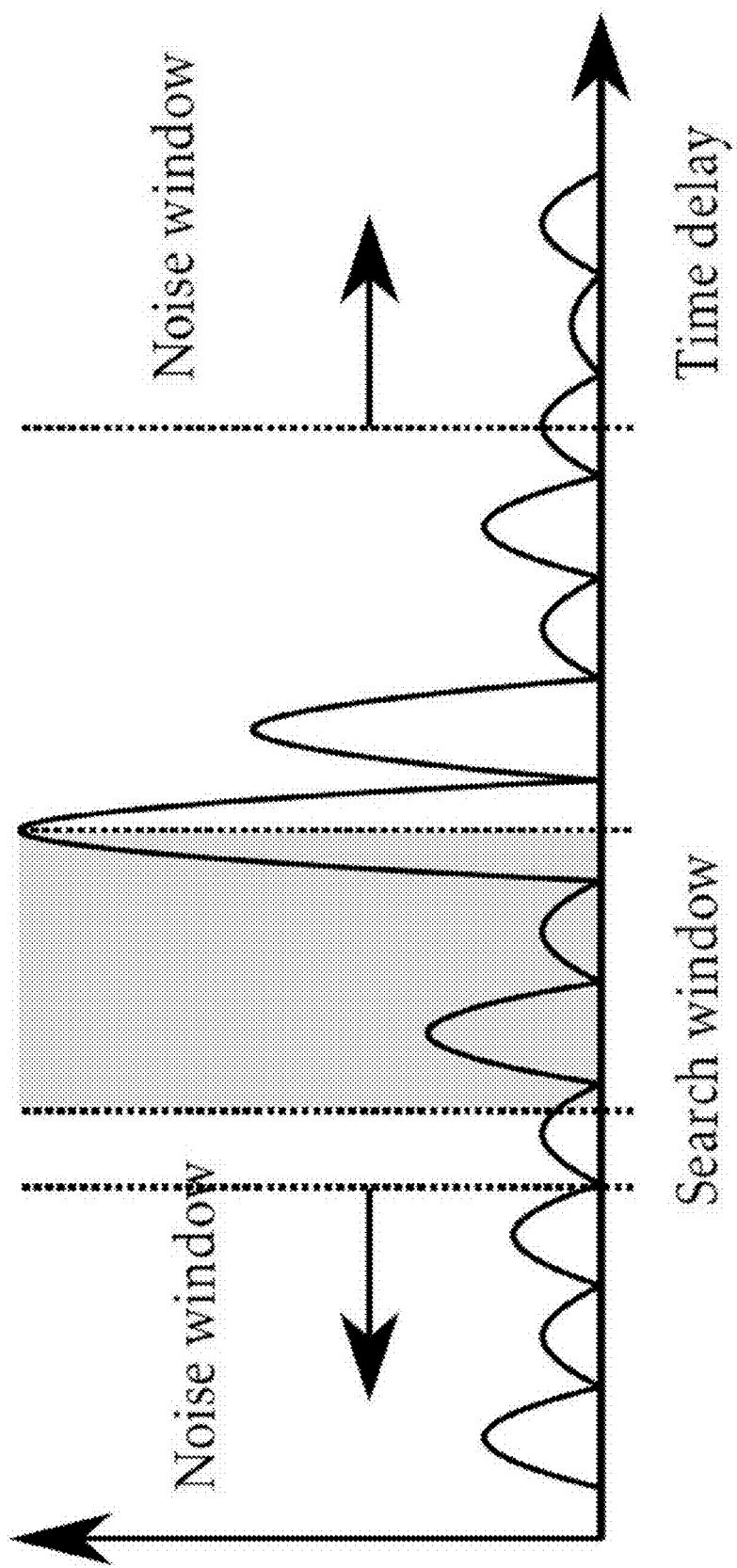
FIG. 10 is a schematic illustration of a normalized profile delay profile according to an example.
Figure 11:
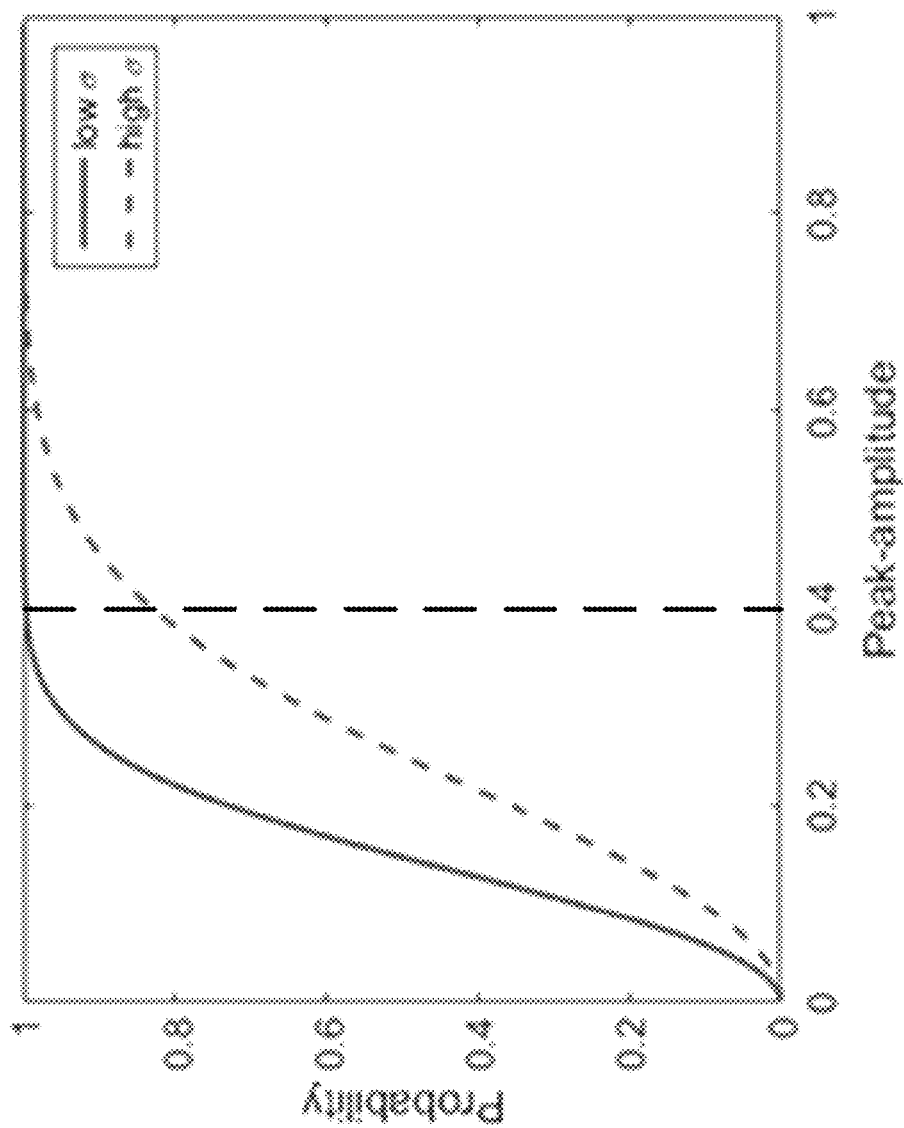
FIG. 11 is a graph illustrating probably of peak amplitudes for low and high a values according to an example.

In Step 93, the probability-threshold and the peak distribution may be used to find the valid peaks inside the search window illustrated in FIG. 10. For example, based on FIG. 10, if a search window peak has an amplitude of 0.4, for a high σ, FIG. 11 shows a 20% probability that it is a noise peak, or in other words, 80% chance that it is a peak caused by one path of the received signal. While for the low σ, the probability is very low that it is a noise peak or very high that the peak is caused by one path of the received signal. This information thus allows the receiver to trade-off between the robustness to LOS detection and noise suppression.

In step 94, based on the valid peaks from FIG. 10, the UE picks one of the valid peaks as the TOA estimate, for example the first of the valid peaks may be selected. In another embodiment, the UE may pick two or more of the valid peaks or it may pick another valid peak based on another criterion. The UE then reports the TOA to the network node, or as in LTE, the Reference Signal Time Difference (RSTD) measurements. In yet another embodiment, the UE may report in the form of a multipath RSTD report as described further above in the introductory part of this specification, when it detects two or more valid peaks per cell. Additionally, the UE may also report the probability information of the detected peak(s).

The sequences below show an example signaling impact according to an embodiment.

```
-- ASN1START
OTDOA-ReferenceCellInfo         ::= SEQUENCE {
    physCellId                  INTEGER (0..503),
    cellGlobalId                ECGI                        OPTIONAL,   -- Need ON
    earfcnRef                   ARFCN-ValueEUTRA            OPTIONAL,   -- Cond NotSameAsServ0
    antennaPortConfig           ENUMERATED {ports1-or-2, ports4, ... }
                                                            OPTIONAL,   -- Cond NotSameAsServ1
    cpLength                    ENUMERATED { normal, extended, ... },
    prsInfo                     PRS-Info                    OPTIONAL,   -- Cond PRS
    ...,
    [[ earfcnRef-v9a0           ARFCN-ValueEUTRA-v9a0       OPTIONAL    -- Cond NotSameAsServ2
    ]],
    [[ tpId-r14                 INTEGER (0..4055)           OPTIONAL    -- Need ON
    ]] ]],
    [[ [[ peakDetectionThresReference-v14                   INTEGER (0..NN)   OPTIONAL -- Need ON  ]]
}
-- ASN1STOP
-- ASN1START
OTDOA-NeighbourCellInfoList ::= SEQUENCE (SIZE (1..waxFreqLayers)) OF OTDOA-NeighbourFreqInfo
OTDOA-NeighbourFreqInfo ::= SEQUENCE (SIZE (1.. 24)) OF OTDOA-NeighbourCellInfoElement
OTDOA-NeighbourCellInfoElement ::= SEQUENCE {
    physCellId                  INTEGER (0..503),
    cellGlobalId                ECGI                        OPTIONAL,   -- Need ON
    earfcn                      ARFCN-ValueEUTRA            OPTIONAL,   -- Cond NotSameAsRef0
    cpLength                    ENUMERATED {normal, extended, ...}
                                                            OPTIONAL,   -- Cond NotSameAsRef1
    prsInfo                     PRS-Info                    OPTIONAL,   -- Cond NotSameAsRef2
    antennaPortConfig           ENUMERATED {ports-1-or-2, ports-4, ...}
                                                            OPTIONAL,   -- Cond NotsameAsRef3
    slotNumberOffset            INTEGER (0..19)             OPTIONAL,   -- Cond NotSameAsRef4
    prs-SubframeOffset          INTEGER (0..1279)           OPTIONAL,   -- Cond InterFreq
    expectedRSTD                INTEGER (0..1638),
    expectedRSTD-Uncertainty    INTEGER (0..1023),
    ...,
    [[ earfcn-v9a0              ARFCN-ValueEUTRA-v9a0       OPTIONAL    -- Cond NotSameAsRef5
    ]],
    [[ tpId-r14                 INTEGER (0..4095)           OPTIONAL,   -- Need ON
        prs-only-tp-r14         ENUMERATED { true }         OPTIONAL    -- Cond TBS
    ]],
    [[ peakDetectionThresNeighbour-v14                      INTEGER (0..NN)   OPTIONAL -- Need ON  ]]
}
maxFreqLayers   INTEGER ::= 3
-- ASN1STOP
```

Figure 12:
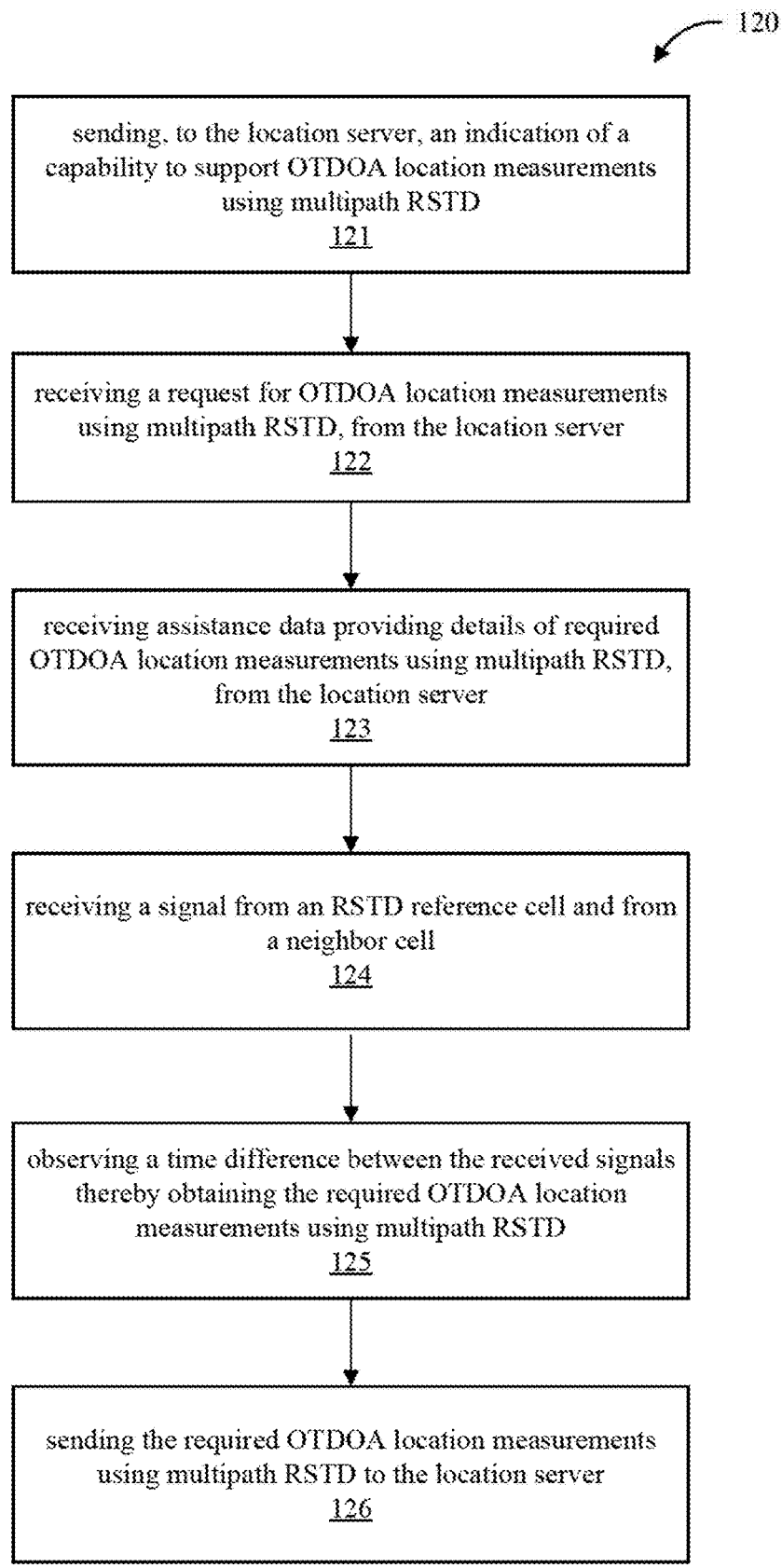
FIG. 12 is a flowchart of a method according to another embodiment.

FIG. 12 illustrates a method 120, which includes some rearrangements of steps and elements previously described. The method 120 is executed in a target device, for providing Observed Time Difference of Arrival (OTDOA) Reference Signal Time Difference (RSTD) measurements to a location server. The method 120 comprises the steps of:

- sending, step 121, to the location server, an indication of a capability to support OTDOA location measurements using multipath RSTD;
- receiving, step 122, a request for OTDOA location measurements using multipath RSTD, from the location server;
- receiving, step 123, assistance data providing details of required OTDOA location measurements using multipath RSTD, from the location server;
- receiving, step 124, a signal from an RSTD reference cell and from a neighbor cell;
- observing a time difference, step 125, between the received signals thereby obtaining the required OTDOA location measurements using multipath RSTD; and
- sending, step 126, the required OTDOA location measurements using multipath RSTD to the location server.

In the method, the neighbor cell for which the time difference is to be observed may be indicated by the location server in the assistance data. The assistance data may contain an indication that triggers the target device to search for additional peaks in at least one received signal. The location server may trigger the execution of the method based on historical information indicating that the target device has previously reported measurements using multipath RSTD. The location server may alternatively trigger the execution of the method based on historical information indicating that the target device has previously been positioned with poor accuracy. The target device may have previously been positioned based on at least two positioning methods such as Global Navigation Satellite System (GNSS) and OTDOA RSTD. The step 125 of observing may further comprise using a peak-probability threshold of a given value to estimate the OTDOA location measurements using multipath RSTD, where a higher threshold provides better robustness to noise. The target device may be operative to exclude non-line of sight (NLOS) OTDOA location measurements, thereby allowing to set a lower peak-probability threshold. The peak-probability may be configured by the location server and may be provided to the target device. The peak-probability threshold may be based on cell deployment data and a network positioning algorithm, the OTDOA location measurements using multipath RSTD may be based on identified valid peaks of signals from the reference and neighbor cells, a valid peak may be a peak above the peak-probability threshold, and the OTDOA location measurements using multipath RSTD may be determined as the firsts of the valid peaks from the reference and neighbor cells.

Figure 13:
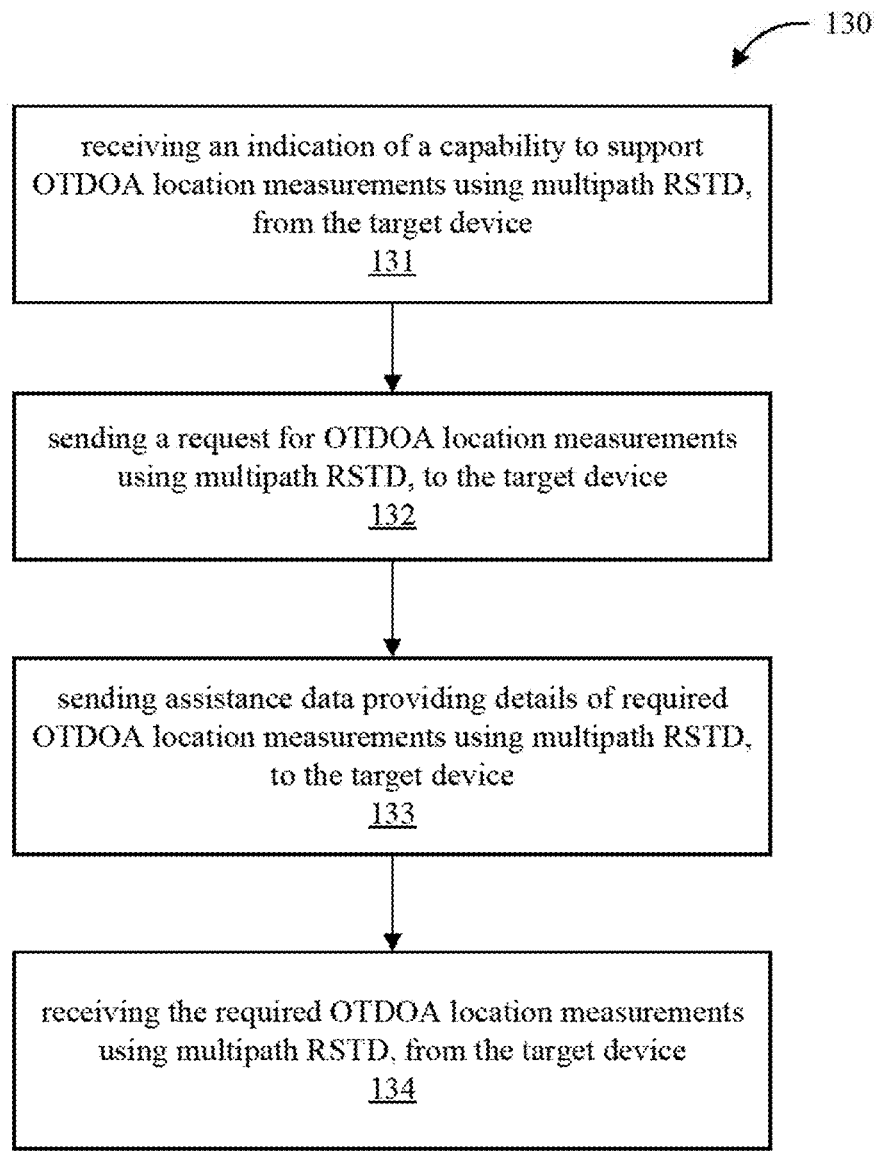
FIG. 13 is a flowchart of a method according to another embodiment.

FIG. 13 illustrates a method 130, which includes some rearrangements of steps and elements previously described. The method 130 is executed in a location server, for receiving Observed Time Difference of Arrival (OTDOA) Reference Signal Time Difference (RSTD) measurements from a target device. The method 130 comprises the steps of:

- receiving, step 131, an indication of a capability to support OTDOA location measurements using multipath RSTD, from the target device;
- sending, step 132, a request for OTDOA location measurements using multipath RSTD, to the target device;
- sending, step 133, assistance data providing details of required OTDOA location measurements using multipath RSTD, to the target device; and
- receiving, step 134, the required OTDOA location measurements using multipath RSTD, from the target device.

The location server may indicate in the assistance data a neighbor cell for which a time difference is to be observed by the target device. The location server may trigger the target device to search for additional peaks in at least one received signal through an indication in the assistance data. The location server may trigger the execution of the method based on historical information indicating that the target device has previously reported measurements using multipath RSTD. The location server may alternatively trigger the execution of the method based on historical information indicating that the target device has previously been positioned with poor accuracy. The target device may have previously been positioned based on at least two positioning methods such as Global Navigation Satellite System (GNSS) and OTDOA RSTD. The location server may provide a peak-probability threshold of a given value to the target device for estimation of the OTDOA location measurements using multipath RSTD, where a higher threshold provides better robustness to noise. The peak-probability threshold may be based on cell deployment data and a network positioning algorithm, the OTDOA location measurements using multipath RSTD may be based on identified valid peaks of signals from the reference and neighbor cells, a valid peak may be a peak above the peak-probability threshold, and the OTDOA location measurements using multipath RSTD may be determined as the firsts of the valid peaks.

There is provided an apparatus/network node comprising processing circuitry and a memory, the memory containing instructions executable by the processing circuitry whereby the apparatus is operative to execute methods related to apparatus/network node embodiments; this is described in more details further below.

There is provided a wireless device (WD) or User Equipment (UE) comprising processing circuitry and a memory, the memory containing instructions executable by the processing circuitry whereby the WD or UE is operative to execute the methods related to WD/UE embodiments; this is described in more details further below.

Computer programs and computer-readable media configured to store instructions for executing steps according to embodiments of methods disclosed herein are also provided.

Certain embodiments may provide one or more of the following technical advantage(s).

The advantages include better and/or more efficient positioning due to the following:

- improved configurability since the network node can configure the peak-probability threshold based on network deployment data, positioning algorithm complexity, etc.;
- the receiver entity can plan when efforts to detect additional paths matter or not.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Figure 14A:
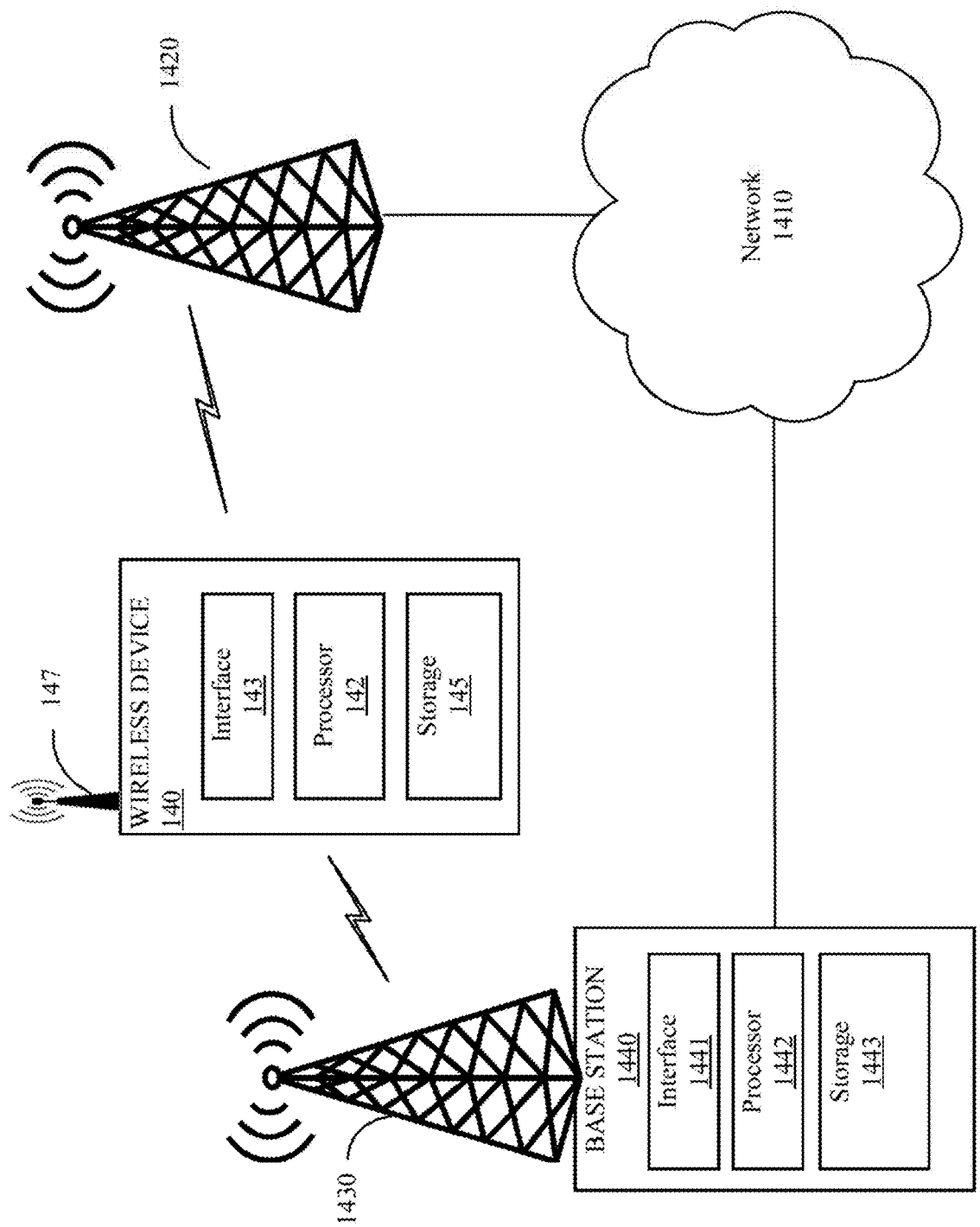
FIG. 14a is a schematic illustration of a wireless network according to an embodiment.

Although the solutions described above may be implemented in any appropriate type of system using any suitable components, particular embodiments of the described solutions may be implemented in a wireless network such as the example wireless communication network illustrated in FIG. 14a. In the example of FIG. 14a, the wireless communication network provides communication and other types of services to one or more wireless devices. The wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 1410 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, 5G or NR standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 14a illustrates a wireless network comprising a network node 1440 and wireless device (WD) 140, in accordance with a particular embodiment. For simplicity, FIG. 14a only depicts network 1410, network nodes 1440 and 1420, and WD 140. Network node 1440 comprises processor 1442, storage 1443, interface 1441, and antenna 1430. Similarly, WD 140 comprises processor 142, storage 145, interface 143 and antenna 147. These components may work together in order to provide network node and/or wireless device functionality, such as providing wireless connections in a wireless network. In different embodiments, the wireless network may comprise any number of wired or wireless networks, network nodes, such as the location server described previously, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

"Network node" includes nodes that are located outside as well as inside buildings or structures. In some instances, structures may cause degradation of the signals or even partially or totally block signal propagation.

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network. Accordingly, in the present case, network node can represent the location server.

As used herein, the term "radio node" is used generically to refer both to wireless devices and network nodes, as each is respectively described above.

In FIG. 14a, Network node 1440 comprises processor 1442, storage 1443, interface 1441, and antenna 1430. These components are depicted as single boxes located within a single larger box. In practice, however, a network node may comprise multiple different physical components that make up a single illustrated component (e.g., interface 1441 may comprise terminals for coupling wires for a wired connection and a radio transceiver for a wireless connection). As another example, network node 1440 may be a virtual network node in which multiple different physically separate components interact to provide the functionality of network node 1440 (e.g., processor 1442 may comprise three separate processors located in three separate enclosures, where each processor is responsible for a different function for a particular instance of network node 1440). Similarly, network node 1440 may be composed of multiple physically separate components (e.g., a NodeB component and a RNC component, a BTS component and a BSC component, etc.), which may each have their own respective processor, storage, and interface components. In certain scenarios in which network node 1440 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 1440 may be configured to support multiple radio access technologies (RATs). In such embodiments, some components may be duplicated (e.g., separate storage 1443 for the different RATs) and some components may be reused (e.g., the same antenna 1430 may be shared by the RATs).

Processor 1442 may be a combination of one or more of a microprocessor, controller, microcontroller, central processing unit, digital signal processor, application-specific integrated circuits, field programmable gate array, or any other suitable computing device, resource, or combination of hardware, software and/or encoded logic operable to provide, either alone or in conjunction with other network node 1440 components, such as storage 1443, network node 1440 functionality. For example, processor 1442 may execute instructions stored in storage 1443. Such functionality may include providing various wireless features discussed herein to a wireless device, such as WD 140, including any of the features or benefits disclosed herein.

Storage 1443 may comprise any form of volatile or non-volatile computer readable memory including, without limitation, persistent storage, solid-state memory, remotely mounted memory, magnetic media, optical media, random access memory (RAM), read-only memory (ROM), removable media, or any other suitable local or remote memory component. Storage 1443 may store any suitable instructions, data or information, including software and encoded logic, utilized by network node 1440. Storage 1443 may be used to store any calculations made by processor 1442 and/or any data received via interface 1441.

Network node 1440 also comprises interface 1441 which may be used in the wired or wireless communication of signalling and/or data between network node 1440, network 1410, and/or WD 140. For example, interface 1441 may perform any formatting, coding, or translating that may be needed to allow network node 1440 to send and receive data from network 1410 over a wired connection. Interface 1441 may also include a radio transmitter and/or receiver that may be coupled to or a part of antenna 1430. The radio may receive digital data that is to be sent out to other network nodes or WDs via a wireless connection. The radio may convert the digital data into a radio signal having the appropriate channel and bandwidth parameters. The radio signal may then be transmitted via antenna 1430 to the appropriate recipient (e.g., WD 140).

Antenna 1430 may be any type of antenna capable of transmitting and receiving data and/or signals wirelessly. In some embodiments, antenna 1430 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Network node 1440 may perform steps or functions described herein in relation with some embodiments.

As such, the network node may by a location server operative to receive Observed Time Difference of Arrival (OTDOA) Reference Signal Time Difference (RSTD) measurements from a target, wireless, device, the location server comprising processing circuitry and a memory, the memory containing instructions executable by the processing circuitry whereby the location server is operative to:

receive an indication of a capability to support OTDOA location measurements using multipath RSTD, from a wireless device;
send a request for OTDOA location measurements using multipath RSTD, to the wireless device;
send assistance data providing details of required OTDOA location measurements using multipath RSTD, to the wireless device; and
receive the required OTDOA location measurements using multipath RSTD, from the wireless device.

The location server may indicate in the assistance data a neighbor cell for which a time difference is to be observed by the target device. The location server may trigger the target device to search for additional peaks in at least one received signal through an indication in the assistance data. The location server may trigger the execution of the method based on historical information indicating that the target device has previously reported measurements using multipath RSTD. The location server may alternatively trigger the execution of the method based on historical information indicating that the target device has previously been positioned with poor accuracy. The target device may have previously been positioned based on at least two positioning methods such as Global Navigation Satellite System (GNSS) and OTDOA RSTD. The location server may provide a peak-probability threshold of a given value to the target device for estimation of the OTDOA location measurements using multipath RSTD, where a higher threshold provides better robustness to noise. The peak-probability threshold may be based on cell deployment data and a network positioning algorithm, the OTDOA location measurements using multipath RSTD may be based on identified valid peaks of signals from the reference and neighbor cells, a valid peak may be a peak above the peak-probability threshold, and the OTDOA location measurements using multipath RSTD may be determined as the firsts of the valid peaks.

As used herein, "wireless device" (WD) refers to a device capable, configured, arranged and/or operable to communicate wirelessly with network nodes and/or another wireless device. In this disclosure, the wireless device is sometimes alternatively called target device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM. UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 14a, WD 140 may be any type of wireless endpoint, mobile station, mobile phone, wireless local loop phone, smartphone, user equipment, desktop computer, PDA, cell phone, tablet, laptop, VoIP phone or handset, vehicle, or other device which is able to wirelessly send and receive data and/or signals to and from a network node, such as network node 1440 and/or other WDs. WD 140 comprises processor 142, storage 145, interface 143, and antenna 147. Like network node 1440, the components of WD 140 are depicted as single boxes located within a single larger box, however, in practice a wireless device may comprise multiple different physical components that make up a single illustrated component (e.g., storage 145 may comprise multiple discrete microchips, each microchip representing a portion of the total storage capacity). Processor 142 may be a combination of one or more of a microprocessor, controller, microcontroller, central processing unit, digital signal processor, application-specific integrated circuits, field programmable gate array, or any other suitable computing device, resource, or combination of hardware, software and/or encoded logic operable to provide, either alone or in combination with other WD 140 components, such as storage 145, WD 140 functionality. Such functionality may include providing various wireless features discussed herein, including any of the features or benefits disclosed herein.

Storage 145 may be any form of volatile or non-volatile memory including, without limitation, persistent storage, solid-state memory, remotely mounted memory, magnetic media, optical media, random access memory (RAM), read-only memory (ROM), removable media, or any other suitable local or remote memory component. Storage 145 may store any suitable data, instructions, or information, including software and encoded logic, utilized by WD) 140. Storage 145 may be used to store any calculations made by processor 142 and/or any data received via interface 143. Storage 145 may comprise computer-readable means on which a computer program can be stored. The computer program may include instructions which cause processor 142 (and any operatively coupled entities and devices, such as interface 143 and storage 145) to execute methods according to embodiments described herein. The computer program and/or computer program product may thus provide means for performing any steps herein disclosed.

Wireless device 140 may perform steps or functions described herein in relation with some embodiments.

Interface 143 may be used in the wireless communication of signaling and/or data between WD 140 and network node 1440. For example, interface 143 may perform any formatting, coding, or translating that may be needed to allow WD 140 to send and receive data from network node 1440 over a wireless connection. Interface 143 may also include a radio transmitter and/or receiver that may be coupled to or a part of antenna 147. The radio may receive digital data that is to be sent out to network node 1440 via a wireless connection. The radio may convert the digital data into a radio signal having the appropriate channel and bandwidth parameters. The radio signal may then be transmitted via antenna 147 to network node 1440.

Antenna 147 may be any type of antenna capable of transmitting and receiving data and/or signals wirelessly. In some embodiments, antenna 147 may comprise one or more omni-directional, sector or panel antennas operable to transmit/receive radio signals between 2 GHz and 66 GHz. For simplicity, antenna 147 may be considered a part of interface 143 to the extent that a wireless signal is being used.

The wireless device 140 as described above is operative to provide Observed Time Difference of Arrival (OTDOA) Reference Signal Time Difference (RSTD) measurements to a location server, the wireless device comprising processing circuitry and a memory, the memory containing instructions executable by the processing circuitry whereby the wireless device is operative to:

send, to the location server, an indication of a capability to support OTDOA location measurements using multipath RSTD;
  receive a request for OTDOA location measurements using multipath RSTD, from the location server;
  receive assistance data providing details of required OTDOA location measurements using multipath RSTD, from the location server;
  receive a signal from an RSTD reference cell and from a neighbor cell;
  observe a time difference between the received signals thereby obtaining the required OTDOA location measurements using multipath RSTD; and
  send the required OTDOA location measurements using multipath RSTD to the location server.

The neighbor cell for which the time difference is to be observed may be indicated by the location server in the assistance data. The assistance data may contain an indication that triggers the wireless device to search for additional peaks in at least one received signal. The execution of the method may be triggered by the location server based on historical information indicating that the wireless device has previously reported measurements using multipath RSTD. The execution of the method may alternatively be triggered by the location server based on historical information indicating that the wireless device has previously been positioned with poor accuracy. The wireless device may have previously been positioned based on at least two positioning methods such as Global Navigation Satellite System (GNSS) and OTDOA RSTD. The wireless device may further be operative to observe the time difference using a peak-probability threshold of a given value to estimate the OTDOA location measurements using multipath RSTD, where a higher threshold provides better robustness to noise. The wireless device may be further operative to exclude non-line of sight (NLOS) OTDOA location measurements, thereby allowing to set a lower peak-probability threshold. The peak-probability may be configured by the location server and may be provided to the wireless device. The peak-probability threshold may also be based on cell deployment data and a network positioning algorithm, the OTDOA location measurements using to multipath RSTD may be based on identified valid peaks of signals from the reference and neighbor cells, a valid peak may be a peak above the peak-probability threshold, and the OTDOA location measurements using multipath RSTD may be determined as the firsts of the valid peaks from the reference and neighbor cells.

The wireless network illustrated in FIG. 14a may include a plurality of wireless devices 140 and a plurality of radio access nodes 1420, 1440, connected to one or more core network nodes (not illustrated) via a network 1410. Wireless devices 140 within a coverage area may each be capable of communicating directly with radio access nodes 1420, 1440 over a wireless interface. In certain embodiments, wireless devices may also be capable of communicating with each other via device-to-device (D2D) communication. In certain embodiments, radio access nodes 1420, 1440 may also be capable of communicating with each other, e.g. via an interface (e.g. X2 in LTE).

In some embodiments, an area of wireless signal coverage associated with a radio access node 1420, 1440 may be referred to as a cell. A wireless device 140 may be configured to operate in carrier aggregation (CA) implying aggregation of two or more carriers in at least one of DL and UL directions. With CA, a wireless device 140 can have multiple serving cells, wherein the term 'serving' herein means that the wireless device 140 is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the wireless device 140 by the network node 1440 using higher layer signaling e.g. by sending RRC configuration message to the wireless device 140. The configured CC is used by the network node 1440 for serving the wireless device 140 on the serving cell (e.g. on PCell, PSCell, SCell, etc.) of the configured CC. The configured CC is also used by the wireless device 140 for performing one or more radio measurements (e.g. RSRP, RSRQ, etc.) on the cells operating on the CC e.g. PCell, SCell or PSCell and neighboring cells.

The term SRS used herein may refer to any type of reference signal (RS) or more generally physical radio signals transmitted by the wireless device 140 in the UL to enable the network node 1440 to determine the UL signal quality e.g. UL SNR, SINR, etc. Examples of such reference signals are sounding reference signals, DMRS, wireless device specific reference or pilot signals, etc. The embodiments are applicable to any type of RS i.e. switching of carrier transmitting any type of RS.

In certain embodiments, radio access nodes 1420, 1440 may interface with a radio network controller. The radio network controller may control radio access nodes 1420, 1440 and may provide certain radio resource management functions, mobility management functions, and/or other suitable functions. In certain embodiments, the functions of the radio network controller may be included in radio access node 1420, 1440. The radio network controller may interface with a core network node (not illustrated). In certain embodiments, the radio network controller may interface with the core network node via an interconnecting network 1410.

The interconnecting network 1410 may refer to any interconnecting system capable of transmitting audio, video, signals, data, messages, or any combination of the preceding. The interconnecting network 1410 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, a core network node may manage the establishment of communication sessions and various other functionalities for wireless devices 147. Examples of core network node may include MSC, MME, SGW, PGW, O&M, OSS, SON, positioning node (e.g. E-SMLC), MDT node, etc. Wireless devices 140 may exchange certain signals with the core network node using the non-access stratum layer. In non-access stratum signaling, signals between wireless devices 140 and the core network node may be transparently passed through the radio access network. In certain embodiments, radio access nodes 1420, 1440 may interface with one or more network nodes over an internode interface.

The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR, 5G, 4G and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, WCDMA/HSPA, GSM/GERAN, WLAN, CDMA2000, etc.

Figure 14B:
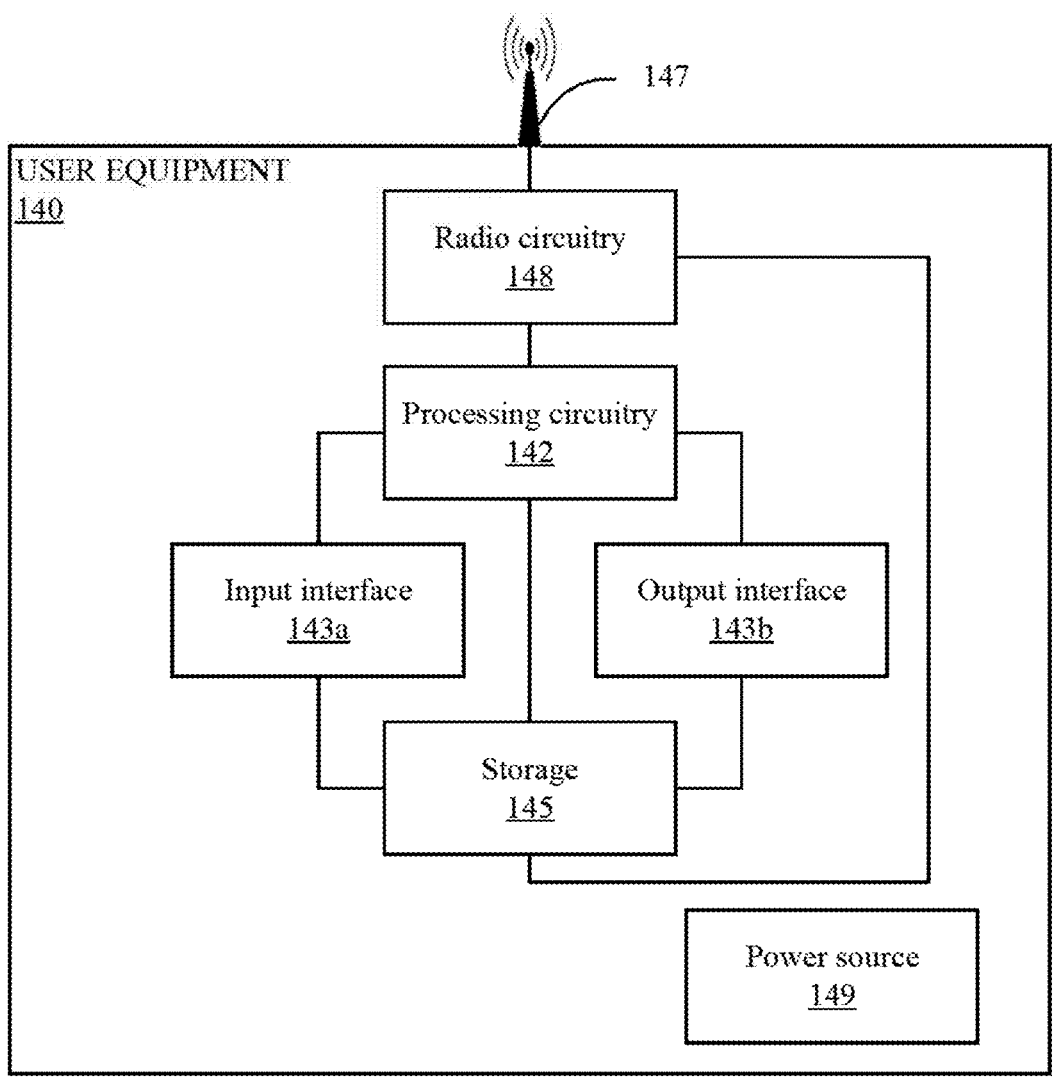
FIG. 14b is a schematic illustration of a user equipment according to an embodiment.

Turning to FIG. 14b, the wireless device 140 may be a user equipment. Wireless device 140 includes an antenna 147, radio front-end circuitry 148, processing circuitry 142, and a computer-readable storage medium 145. Antenna 147 may include one or more antennas or antenna arrays, and is configured to send and/or receive wireless signals, and is connected to radio front-end circuitry 148. In certain alternative embodiments, wireless device 140 may not include antenna 147, and antenna 147 may instead be separate from wireless device 140 and be connectable to wireless device 140 through an interface or port.

The radio front-end circuitry 148 may comprise various filters and amplifiers, is connected to antenna 147 and processing circuitry 142, and is configured to condition signals communicated between antenna 147 and processing circuitry 142. In certain alternative embodiments, wireless device 140 may not include radio front-end circuitry 148, and processing circuitry 142 may instead be connected to antenna 147 without radio front-end circuitry 148.

Processing circuitry 142 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 142 may include, for example, one or more central processing units (CPUs), one or more microprocessors, one or more application-specific integrated circuits (ASICs), and/or one or more field programmable gate arrays (FPGAs).

In particular embodiments, some or all of the functionality described herein as being provided by a wireless device may be provided by the processing circuitry 142 executing instructions stored on a computer-readable storage medium 145. In alternative embodiments, some or all of the functionality may be provided by the processing circuitry 142 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 142 alone or to other components of wireless device 140, but are enjoyed by the wireless device as a whole, and/or by end users and the wireless network generally.

Antenna 147, radio front-end circuitry 148, and/or processing circuitry 142 may be configured to perform any receiving operations described herein as being performed by a wireless device. Any information, data and/or signals may be received from a network node and/or another wireless device.

The processing circuitry 142 may be configured to perform any operations described herein as being performed by a wireless device. Operations performed by processing circuitry 142 may include processing information obtained by the processing circuitry 142 by, for example, converting the obtained information into other information, comparing the obtained information or converted information to information stored in the wireless device, and/or performing one or more operations based on the obtained information or converted information, and as a result of said processing making a determination.

Antenna 147, radio front-end circuitry 148, and/or processing circuitry 142 may be configured to perform any transmitting operations described herein as being performed by a wireless device. Any information, data and/or signals may be transmitted to a network node and/or another wireless device.

Computer-readable storage medium 145 is generally operable to store instructions, such as a computer program, software, an application including one or more of logic, rules, code, tables, etc. and/or other instructions capable of being executed by a processor. Examples of computer-readable storage medium 145 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 142. In some embodiments, processing circuitry 142 and computer-readable storage medium 145 may be considered to be integrated.

Alternative embodiments of wireless device or UE 140 may include additional components beyond those shown in FIG. 14*b* that may be responsible for providing certain aspects of the wireless device's functionality, including any of the functionality described herein and/or any functionality necessary to support the solution described above. As just one example, wireless device 140 may include input interfaces, devices and circuits, and output interfaces, devices and circuits. Input interfaces, devices, and circuits are configured to allow input of information into wireless device 140, and are connected to processing circuitry 142 to allow processing circuitry 142 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from wireless device 140, and are connected to processing circuitry 142 to allow processing circuitry 142 to output information from wireless device 140. For example, output interfaces, devices, or circuits may include a speaker, a display, vibrating circuitry, a USB port, a headphone interface, or other output elements. Using one or more input and output interfaces, devices, and circuits, wireless device 140 may communicate with end users and/or the wireless network, and allow them to benefit from the functionality described herein.

As another example, wireless device or UE 140 may include power source 149. Power source 149 may comprise power management circuitry. Power source 149 may receive power from a power supply, which may either be comprised in, or be external to, power source 149. For example, wireless device 140 may comprise a power supply in the form of a battery or battery pack which is connected to, or integrated in, power source 149. Other types of power sources, such as photovoltaic devices, may also be used. As a further example, wireless device 140 may be connectable to an external power supply (such as an electricity outlet) via an input circuitry or interface such as an electrical cable, whereby the external power supply supplies power to power source 149. Power source 149 may be connected to radio front-end circuitry 148, processing circuitry 142, and/or computer-readable storage medium 145 and be configured to supply wireless device 140, including processing circuitry 142, with power for performing the functionality described herein.

Wireless device 140 may also include multiple sets of processing circuitry 142, computer-readable storage medium 145, radio circuitry 148, and/or antenna 147 for different wireless technologies integrated into wireless device 140, such as, for example, GSM, WCDMA, LTE, NR, WiFi, or Bluetooth wireless technologies. These wireless technologies may be integrated into the same or different chipsets and other components within wireless device 140.

Any appropriate steps, methods, or functions described herein may also be performed through one or more functional modules.

Figure 14C:
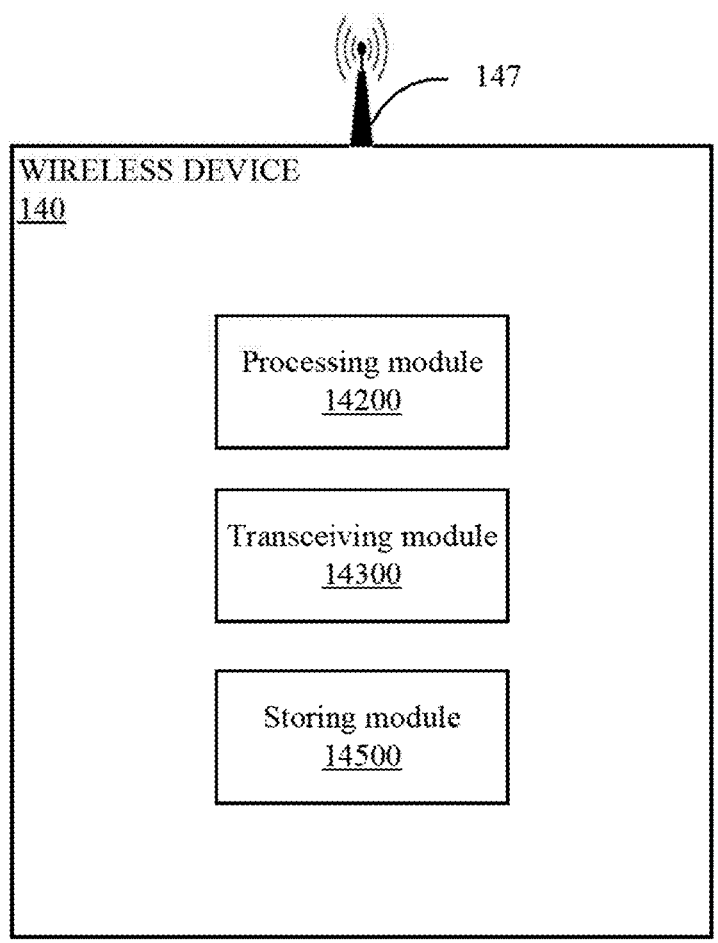
FIG. 14c is a schematic illustration of a wireless device according to an embodiment.

Referring to FIG. 14*c*, the wireless device 140 may comprise an antenna 147, a processing module 14200, a transceiving module 14300 and a storing module 14500 that may perform steps or functions described herein in relation with some embodiments.

Figure 14D:
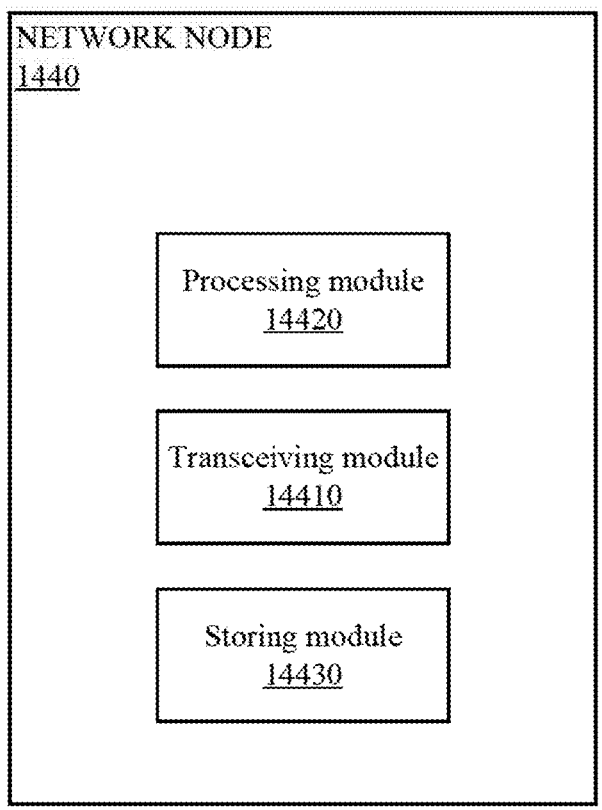
FIG. 14d is a schematic illustration of a network node according to an embodiment.

Referring to FIG. 14d, the network node 1440 may comprise a processing module 14420, a transceiving module 14410 and a storing module 14430 that may perform steps or functions described herein in relation with some embodiments.

Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 142 and/or 1442, possibly in cooperation with storage 145 and/or 1443. Processors 142 and/or 1442 and storage 145 and/or 1443 may thus be arranged to allow processors 142 and/or 1442 to fetch instructions from storage 145 and/or 1443 and execute the fetched instructions to allow the respective functional module to perform any steps or functions disclosed herein.

Figure 15:
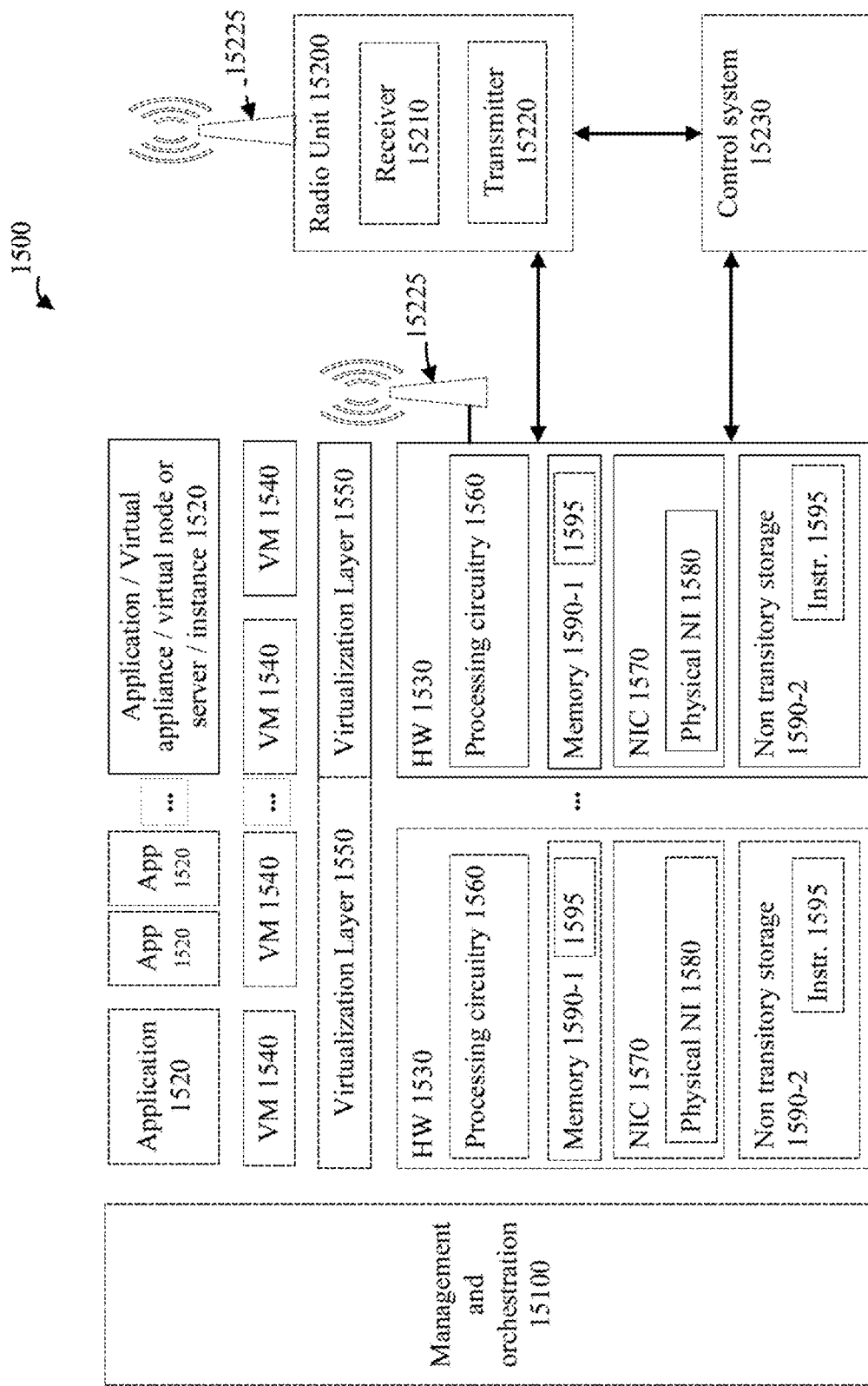
FIG. 15 illustrates a virtualization environment in which functions according to some embodiment(s) may be implemented.

FIG. 15 is a schematic block diagram illustrating a virtualization environment 1500 in which functions implemented by some embodiment(s) may be virtualized. As used herein, virtualization can be applied to a node (e.g., a virtualized base station or a virtualized radio access node), in the present case the location server, or to a device (e.g. user device or any type of wireless communication device) and relates to an implementation in which at least a portion of the functionality is implemented as a virtual component(s) (e.g., via application(s)/component(s)/function(s) or virtual machine(s) executing on a physical processing node(s) in a network(s)).

In some embodiments, some or all of the functions described herein may be implemented as virtual components executed by one or more virtual machines implemented in a virtual environment(s) hosted by the hardware node(s) 1530. Further, in embodiments in which the virtual node is not a radio access node or does not require radio connectivity (e.g., a core network node or a location server), then the network node may be entirely virtualized.

The functions may be implemented by an application 1520 (which may alternatively be called a software instance, a virtual appliance, a network function, a virtual node, or a virtual network function) operative to implement steps of some method(s) according to some embodiment(s). The application 1520 runs in a virtualization environment 1500 which provides hardware 1530 comprising processing circuitry 1560 and memory 1590. The memory contains instructions 1595 executable by the processing circuitry 1560 whereby the application 1520 is operative to execute the method(s) or steps of the method(s) previously described in relation with some embodiment(s). The virtualization environment 1500, comprises a general-purpose or special-purpose network hardware device(s) 1530 comprising a set of one or more processor(s) or processing circuitry 1560, which may be commercial off-the-shelf (COTS) processors, dedicated Application Specific Integrated Circuits (ASICs), or any other type of processing circuitry including digital or analog hardware components or special purpose processors. The hardware device(s) comprises a memory 1590-1 which may be a transitory memory for storing instructions 1595 or software executed by the processing circuitry 1560. The hardware device(s) comprises network interface controller(s) 1570 (NICs), also known as network interface cards, which include physical Network Interface 1580. The hardware device(s) also includes non-transitory machine-readable storage media 1590-2 having stored therein software 1595 and/or instruction executable by the processing circuitry 1560. Software 1595 may include any type of software including software for instantiating the virtualization layer or hypervisor, software to execute virtual machines 1540 as well as software allowing to execute functions described in relation with some embodiment(s) described previously.

Virtual machines 1540, implement virtual processing, virtual memory, virtual networking or interface and virtual storage, and may be run by the virtualization layer or hypervisor 1550. Different embodiments of the instance or virtual appliance 1520 may be implemented on one or more of the virtual machine(s) 1540, and the implementations may be made in different ways.

During operation, the processing circuitry 1560 executes software 1595 to instantiate the hypervisor or virtualization layer, which may sometimes be referred to as a virtual machine monitor (VMM). The hypervisor 1550 may present a virtual operating platform that appears like networking hardware to virtual machine 1540. As shown in the FIG. 15, hardware 1530 may be a standalone network node, with generic or specific hardware. Hardware 1530 may comprise an antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high-volume server hardware, physical switches, and physical storage, which can be located in Data centers, and customer premise equipment. In an embodiment, the location server or functions thereof could be virtualized.

In the context of NFV, a virtual machine 1540 is a software implementation of a physical machine that runs programs as if they were executing on a physical, non-virtualized machine. Each of the virtual machines 1540, and that part of the hardware 1530 that executes that virtual machine, be it hardware dedicated to that virtual machine and/or time slices of hardware temporally shared by that virtual machine with others of the virtual machine(s) 1540, forms a separate virtual network element(s) (VNE). Still in the context of NFV. Virtual Network Function (VNF) is responsible for handling specific network functions that run in one or more virtual machines on top of the hardware networking infrastructure and corresponds to application 1520 in FIG. 15.

In some embodiments, one or more radio units 15200 that each includes one or more transmitters 15220 and one or more receivers 15210 may be coupled to one or more antennas 15225. The radio units 15200 may communicate directly with hardware node(s) 1530 via an appropriate network interface(s) and may be used in combination with the virtual components to provide a virtual node with radio capabilities, such as a radio access node or a base station.

In some embodiments, some signaling can be effected with the use of a control system 15230 which may alternatively be used for communication between the hardware node(s) 1530 and the radio unit(s) 15200.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method, executed in a target device, for providing Observed Time Difference of Arrival (OTDOA) Reference Signal Time Difference (RSTD) measurements to a location server, comprising:
sending, to the location server, an indication of a capability to support OTDOA location measurements using multipath RSTD;
receiving a request for OTDOA location measurements using multipath RSTD, from the location server;
receiving assistance data providing details of required OTDOA location measurements using multipath RSTD, from the location server;
receiving a signal from an RSTD reference cell and a signal from a neighbor cell;
observing a time difference between the received signals for obtaining the required OTDOA location measurements using multipath RSTD; and
sending the required OTDOA location measurements using multipath RSTD to the location server, the multipath RSTD being based on multiple peaks in response to the request for OTDOA location measurements from the location server.

2. The method of claim 1, wherein the neighbor cell for which the time difference is to be observed is indicated by the location server in the assistance data.

3. The method of claim 1, wherein the assistance data contains an indication that triggers the target device to search for additional peaks in at least one of the received signals.

4. The method of claim 3, wherein the location server triggers the execution of the method based on historical information indicating that the target device has previously reported measurements using multipath RSTD.

5. The method of claim 3, wherein the target device has previously been positioned based on at least two positioning methods, the at least two positioning methods comprising Global Navigation Satellite System (GNSS) and OTDOA RSTD.

6. The method of claim 1, wherein observing further comprises using a peak-probability threshold of a given value to estimate the OTDOA location measurements using multipath RSTD, where a higher peak-probability threshold is associated with a higher robustness to noise.

7. The method of claim 6, wherein the target device is operative to exclude non-line of sight (NLOS) OTDOA location measurements, thereby allowing to set a lower peak-probability threshold.

8. The method of claim 6, wherein the peak-probability threshold is configured by the location server and is provided to the target device.

9. The method of claim 6, wherein:
the peak-probability threshold is based on cell deployment data and a network positioning algorithm;
the OTDOA location measurements using multipath RSTD are based on identified valid peaks of the received signals from the reference and neighbor cells;
a valid peak is a peak above the peak-probability threshold; an
the OTDOA location measurements using multipath RSTD are determined as the firsts of the valid peaks of the received signals from the reference and neighbor cells.

10. A method, executed in a location server, for receiving Observed Time Difference of Arrival (OTDOA) Reference Signal Time Difference (RSTD) measurements from a target device, comprising:
receiving an indication of a capability to support OTDOA location measurements using multipath RSTD, from the target device;
sending a request for OTDOA location measurements using multipath RSTD, to the target device;
sending assistance data providing details of required OTDOA location measurements using multipath RSTD, to the target device; and
receiving the required OTDOA location measurements using multipath RSTD, from the target device, the multipath RSTD being based on multiple peaks in response to the request for OTDOA location measurements from the location server.

11. The method of claim 10, wherein the location server indicates in the assistance data a neighbor cell for which a time difference is to be observed by the target device.

12. The method of claim 10, wherein the location server triggers the target device to search for additional peaks in at least one received signal through an indication in the assistance data.

13. The method of claim 12, wherein the location server triggers the execution of the method based on historical information indicating that the target device has previously reported measurements using multipath RSTD.

14. The method of claim 12, wherein the target device has previously been positioned based on at least two positioning methods, the at least two positioning methods comprising Global Navigation Satellite System (GNSS) and OTDOA RSTD.

15. The method of claim 10, wherein the location server provides a peak-probability threshold of a given value to the target device for estimation of the OTDOA location measurements using multipath RSTD, where a higher peak-probability threshold is associated with a higher robustness to noise.

16. The method of claim 15, wherein:
the peak-probability threshold is based on cell deployment data and a network positioning algorithm;
the OTDOA location measurements using multipath RSTD are based on identified valid peaks of signals from the reference and neighbor cells;
a valid peak is a peak above the peak-probability threshold; and
the OTDOA location measurements using multipath RSTD are determined as the firsts of the valid peaks.

17. A wireless device operative to provide Observed Time Difference of Arrival (OTDOA) Reference Signal Time Difference (RSTD) measurements to a location server, the wireless device comprising processing circuitry and a memory, said memory containing instructions executable by said processing circuitry to cause said wireless device to be operative to:
send, to the location server, an indication of a capability to support OTDOA location measurements using multipath RSTD;
receive a request for OTDOA location measurements using multipath RSTD, from the location server;

receive assistance data providing details of required OTDOA location measurements using multipath RSTD, from the location server;

receive a signal from an RSTD reference cell and a signal from a neighbor cell;

observe a time difference between the received signals obtaining the required OTDOA location measurements using multipath RSTD; and send the required OTDOA location measurements using multipath RSTD to the location server, the multipath RSTD being based on multiple peaks in response to the request for OTDOA location measurements from the location server.

18. The wireless device of claim 17, wherein the neighbor cell for which the time difference is to be observed is indicated by the location server in the assistance data.

19. The wireless device of claim 17, wherein the assistance data contains an indication that triggers the wireless device to search for additional peaks in at least one of the received signals.

20. The wireless device of claim 19, wherein the execution of the method is triggered by the location server based on historical information indicating that the wireless device has previously reported measurements using multipath RSTD.

21. The wireless device of claim 19, wherein the wireless device has previously been positioned based on at least two positioning methods, the at least two positioning methods comprising Global Navigation Satellite System (GNSS) and OTDOA RSTD.

22. The wireless device of claim 17, further operative to observe the time difference using a peak-probability threshold of a given value to estimate the OTDOA location measurements using multipath RSTD, where a higher peak-probability threshold is associated with a higher robustness to noise.

23. The wireless device of claim 22, further operative to exclude non-line of sight (NLOS) OTDOA location measurements, thereby allowing to set a lower peak-probability threshold.

24. The wireless device of claim 22, wherein the peak-probability threshold is configured by the location server and is provided to the wireless device.

25. The wireless device of claim 22, wherein the peak-probability threshold is based on cell deployment data and a network positioning algorithm, wherein the OTDOA location measurements using multipath RSTD are based on identified valid peaks of signals from the reference and neighbor cells, wherein a valid peak is a peak above the peak-probability threshold, and wherein the OTDOA location measurements using multipath RSTD are determined as the firsts of the valid peaks from the reference and neighbor cells.

26. A location server operative to receive Observed Time Difference of Arrival (OTDOA) Reference Signal Time Difference (RSTD) measurements from a wireless device, the location server comprising processing circuitry and a memory, said memory containing instructions executable by said processing circuitry whereby said location server is operative to:

receive an indication of a capability to support OTDOA location measurements using multipath RSTD, from a wireless device;

send a request for OTDOA location measurements using multipath RSTD, to the wireless device;

send assistance data providing details of required OTDOA location measurements using multipath RSTD, to the wireless device; and receive the required OTDOA location measurements using multipath RSTD, from the wireless device, the multipath RSTD being based on multiple peaks in response to the request for OTDOA location measurements from the location server.

27. The location server of claim 26, wherein the location server indicates in the assistance data a neighbor cell for which a time difference is to be observed by the target device.

28. The location server of claim 26, wherein the location server triggers the target device to search for additional peaks in at least one received signal through an indication in the assistance data.

29. The location server of claim 28, wherein the location server triggers the execution of the method based on historical information indicating that the target device has previously reported measurements using multipath RSTD.

30. The location server of claim 28, wherein the target device has previously been positioned based on at least two positioning methods, the at least two positioning methods comprising Global Navigation Satellite System (GNSS) and OTDOA RSTD.

31. The location server of claim 26, wherein the location server provides a peak-probability threshold of a given value to the target device for estimation of the OTDOA location measurements using multipath RSTD, where a higher peak-probability threshold is associated with a higher robustness to noise.

32. The location server of claim 31, wherein:

the peak-probability threshold is based on cell deployment data and a network positioning algorithm;

the OTDOA location measurements using multipath RSTD are based on identified valid peaks of signals from the reference and neighbor cells;

a valid peak is a peak above the peak-probability threshold; and the OTDOA location measurements using multipath RSTD are determined as the firsts of the valid peaks.

* * * * *

UNITED STATES PATENT AND TRADEMARK OFFICE
CERTIFICATE OF CORRECTION

PATENT NO. : 11,187,773 B2
APPLICATION NO. : 15/752091
DATED : November 30, 2021
INVENTOR(S) : Rydén et al.

It is certified that error appears in the above-identified patent and that said Letters Patent is hereby corrected as shown below:

On the Title Page

On Page 2, item (56), under "OTHER PUBLICATIONS", in Column 2, Line 2, delete "byKamiar Radnosrati" and insert -- by Kamiar Radnosrati --, therefor.

On Page 2, item (56), under "OTHER PUBLICATIONS", in Column 2, Line 14, delete "Action Action" and insert -- Action --, therefor.

On Page 2, item (56), under "OTHER PUBLICATIONS", in Column 2, Line 23, delete "201937015470 ;consisting" and insert -- 201937015470; consisting --, therefor.

On Page 2, item (56), under "OTHER PUBLICATIONS", in Column 2, Line 29, delete "OTD0A" and insert -- OTDOA --, therefor.

In the Drawings

In Fig. 8, Sheet 9 of 19, for Step "81", in Line 2, delete "association one" and insert -- association with one --, therefor.

In the Specification

In Column 1, below Title, insert -- This application is a 35 U.S.C. § 371 national phase filing of International Application No. PCT/IB2017/056797, filed Nov. 1, 2017, which claims the benefit of U.S. Provisional Application No. 62/417,442, filed Nov. 4, 2016, the disclosures of which are incorporated herein by reference in their entireties. --.

In Column 2, Line 31, delete "(PRS)" and insert -- (PRSs) --, therefor.

Signed and Sealed this
Thirty-first Day of May, 2022

Katherine Kelly Vidal
*Director of the United States Patent and Trademark Office*

CERTIFICATE OF CORRECTION (continued)
U.S. Pat. No. 11,187,773 B2

In Column 3, Lines 27-29, delete " $R[\tau] = \sum_{i=0}^{K} y[i]x^{-}[i-\tau],$ " and insert -- $R[\tau] = \sum_{i=0}^{K} y[i]x^{*}[i-\tau],$ --, therefor.

In Column 6, Line 18, delete "probably of peak" and insert -- probability of peak --, therefor.

In Column 6, Line 19, delete "a values" and insert -- σ values --, therefor.

In Column 7, Line 53, delete "TRUE. e.g." and insert -- TRUE, e.g. --, therefor.

In Column 8, Line 3, delete "LIE" and insert -- UE --, therefor.

In Column 8, Line 20, delete "FALSE. e.g." and insert -- FALSE, e.g. --, therefor.

In Column 8, Line 59, delete "association one" and insert -- association with one --, therefor.

In Column 9, Line 14, delete "association one" and insert -- association with one --, therefor.

In Columns 9 & 10, Line 53, delete "v-14" and insert -- v14 --, therefor.

In Column 11, Line 12, delete "given" and insert -- gives --, therefor.

In Column 11, Line 26, delete "a if" and insert -- σ if --, therefor.

In Column 14, Lines 7-8, delete "data a neighbor" and insert -- data of a neighbor --, therefor.

In Column 18, Lines 6-7, delete "data a neighbor" and insert -- data of a neighbor --, therefor.

In Column 19, Line 6, delete "(IOT)" and insert -- (IoT) --, therefor.

In Column 19, Line 62, delete "WD) 140." and insert -- WD 140. --, therefor.

In Column 21, Line 9, delete "using to multipath" and insert -- using multipath --, therefor.

In Column 22, Line 19, delete "wireless devices 147." and insert -- wireless devices 140. --, therefor.

In Column 25, Line 46, delete "memory 1590." and insert -- memory 1590-1. --, therefor.

In Column 26, Line 45, delete "NFV." and insert -- NFV, --, therefor.

In the Claims

In Column 28, Lines 1-2, in Claim 9, delete "threshold; an" and insert -- threshold; and --, therefor.

CERTIFICATE OF CORRECTION (continued)
U.S. Pat. No. 11,187,773 B2

In Column 28, Line 25, in Claim 11, delete "data a neighbor" and insert -- data of a neighbor --, therefor.

In Column 30, Line 21, in Claim 27, delete "data a neighbor" and insert -- data of a neighbor --, therefor.